United States Patent
Wu et al.

(10) Patent No.: US 8,715,487 B2
(45) Date of Patent: *May 6, 2014

(54) LOW SMALL MESOPOROUS PEAK CRACKING CATALYST AND METHOD OF USING

(75) Inventors: Jianxin Jason Wu, Clinton, NJ (US); William A. Wachter, Flemington, NJ (US); Colin L. Beswick, Lebanon, NJ (US); Edward Thomas Habib, Jr., Ellicott City, MD (US); Terry G. Roberie, Ellicott City, MD (US); Ruizhong Hu, Cooksville, MD (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 449 days.

This patent is subject to a terminal disclaimer.

(21) Appl. No.: 13/029,367

(22) Filed: Feb. 17, 2011

(65) Prior Publication Data

US 2011/0220549 A1    Sep. 15, 2011

Related U.S. Application Data

(60) Provisional application No. 61/339,928, filed on Mar. 11, 2010.

(51) Int. Cl.
- *C10G 11/05* (2006.01)
- *C10G 11/02* (2006.01)
- *C10G 11/00* (2006.01)
- *B01J 29/08* (2006.01)

(52) U.S. Cl.
USPC ............. 208/118; 208/46; 208/106; 208/113; 502/79; 502/80; 502/60; 502/63; 502/64

(58) Field of Classification Search
USPC .......... 208/46, 106, 113, 118; 502/60, 63, 64, 502/79
See application file for complete search history.

(56) References Cited

U.S. PATENT DOCUMENTS

| | | | |
|---|---|---|---|
| 3,140,253 A * | 7/1964 | Plank et al. | 208/120.15 |
| 3,375,065 A | 3/1968 | McDaniel et al. | |

(Continued)

FOREIGN PATENT DOCUMENTS

| | | |
|---|---|---|
| EP | 1882676 | 1/2008 |
| EP | 1938898 | 7/2008 |

(Continued)

OTHER PUBLICATIONS

Janssen, Andries H.; Koster, Abraham J.; de Jong, Krijin P.; "Three-Dimensional Transmission Electron Microscopy Observations of Mesopores in Dealuminated Zeolite Y," Angew. Chem. Int. Ed. 2001, 40 (6), 1102-1104.

(Continued)

*Primary Examiner* — Walter D Griffin
*Assistant Examiner* — Derek Mueller

(57) ABSTRACT

This invention relates to the composition, method of making and use of a fluidized catalytic cracking ("FCC") catalyst that is comprised of a new Y zeolite which exhibits an exceptionally low small mesoporous peak around the 40 Å (angstrom) range as determined by nitrogen adsorption measurements. FCC catalysts made from this new zeolite exhibit improved rates of heavy oil cracking heavy oil bottoms conversions and gasoline conversions. The fluidized catalytic cracking catalysts herein are particularly useful in fluidized catalytic cracking ("FCC") processes for conversion of heavy hydrocarbon feedstocks such as gas oils and vacuum tower bottoms.

20 Claims, 13 Drawing Sheets

BJH Nitrogen Desorption Plot of EMY Zeolite (as fabricated)

(56) References Cited

U.S. PATENT DOCUMENTS

| | | |
|---|---|---|
| 3,781,199 A | 12/1973 | Ward |
| 4,086,187 A | 4/1978 | Lim et al. |
| 4,206,085 A | 6/1980 | Lim et al. |
| 5,069,890 A | 12/1991 | Dai et al. |
| 5,087,348 A | 2/1992 | Dai et al. |
| 5,354,452 A | 10/1994 | Dai et al. |
| 5,447,622 A * | 9/1995 | Kerby et al. ............... 208/78 |
| 5,534,135 A | 7/1996 | Dai et al. |
| 5,538,710 A | 7/1996 | Guo et al. |
| 5,601,798 A | 2/1997 | Cooper et al. |
| 5,849,258 A | 12/1998 | Lujano et al. |
| 5,902,564 A | 5/1999 | Lujano et al. |
| 6,054,113 A | 4/2000 | Vaughan et al. |
| 6,746,659 B2 | 6/2004 | Pinnavaia et al. |
| 7,589,041 B2 | 9/2009 | Ying et al. |
| 2001/0044372 A1 | 11/2001 | Vaughan et al. |
| 2001/0053868 A1* | 12/2001 | Chester et al. ............... 585/648 |
| 2007/0227351 A1 | 10/2007 | Garcia-Martinez |
| 2007/0244347 A1 | 10/2007 | Ying et al. |
| 2008/0138274 A1 | 6/2008 | Garcia-Martinez |
| 2009/0005236 A1 | 1/2009 | Ying et al. |
| 2009/0090657 A1 | 4/2009 | Ying et al. |
| 2009/0110631 A1 | 4/2009 | Garcia-Martinez et al. |
| 2009/0139900 A1 | 6/2009 | Wachter et al. |
| 2009/0283443 A1 | 11/2009 | Kuroda et al. |
| 2009/0326177 A1 | 12/2009 | Ying et al. |
| 2010/0065477 A1 | 3/2010 | Wu |
| 2010/0092383 A1 | 4/2010 | Ying et al. |

FOREIGN PATENT DOCUMENTS

| | | |
|---|---|---|
| WO | 2004050548 | 6/2004 |
| WO | 2009062742 | 5/2009 |

OTHER PUBLICATIONS

Teyssier, L., Thomas, M., Bouchy, C., Martens, J. A., Guillon, E.; "Liquid chromatography metod for quantification of surface connected mesoporosity in ultrastable Y zeolites," Microporous and Mesoporous Materials, 100 (2007) 6-11.

Sato, Koichi; Nishimura, Yoichi; Matsubaashi, Nobuyuki; Imamura Motoyasu; Shimada, Hiromichi; "Structural changes of Y zeolites during ion exchange treatment: effects of Si/Al ratio of the starting NaY," Microporous and Mesoporous Materials, 59 (2003) 133-146.

Janssen, A. H.; Koster, A. J.; de jong, K. P.; "On the Shape of the Mesopores in Zeolite Y: A Three-Dimensional Transmission Electron Microscopy Study Combined with Texture Analysis," J. Phys. Chem. B, 2002, 106, 11905-11909.

* cited by examiner

PRIOR ART

BJH Nitrogen Desorption Plot of USY Zeolite (as fabricated)

PRIOR ART

BJH Nitrogen Desorption Plot of USY Zeolite (after deactivation steaming)

BJH Nitrogen Desorption Plot of EMY Zeolite (as fabricated)

BJH Nitrogen Desorption Plot of USY Zeolite (after deactivation steaming)

| Catalyst Formulation | 40% LS-USY 21% SiO2 39% Clay | 40% LS-USY 21% SiO2 39% Clay | 40% LS-EMY 21% SiO2 39% Clay | 40% ULS-USY 21% SiO2 39% Clay | 40% ULS-USY 21% SiO2 39% Clay | 40% ULS-EMY 21% SiO2 39% Clay |
|---|---|---|---|---|---|---|
| Fresh Catalyst Properties | | | | | | |
| Na (wt%) | 0.27 | 0.26 | 0.29 | 0.11 | 0.11 | 0.16 |
| BET Surface Area, m$^2$/g | 344 | 347 | 321 | 353 | 344 | 302 |
| Matrix Surface Area, m$^2$/g | 59 | 56 | 54 | 58 | 56 | 54 |
| Zeolite Surface Area, m$^2$/g | 285 | 292 | 267 | 295 | 288 | 247 |
| Steam-deactivated Catalyst Properties | | | | | | |
| BET Surface Area, m$^2$/g | 256 | 262 | 254 | 222 | 262 | 245 |
| Matrix Surface Area, m$^2$/g | 41 | 38 | 36 | 35 | 40 | 39 |
| Zeolite Surface Area, m$^2$/g | 215 | 224 | 218 | 187 | 222 | 206 |
| N2 BJH 40 Å Peak Height | 0.15 | 0.17 | 0.05 | 0.13 | 0.11 | 0.06 |

FIGURE 5

Catalyst Properties for USY and EMY Catalysts with SiO$_2$ Binder

Process Test Data for LS-USY and LS-EMY Catalysts with SiO$_2$ Binder (Example 4)

Process Test Data for LS-USY and LS-EMY Catalysts with SiO$_2$ Binder (Example 4)

Process Test Data for ULS-USY and ULS-EMY Catalysts with SiO₂ Binder (Example 4)

Process Test Data for ULS-USY and ULS-EMY Catalysts with SiO$_2$ Binder (Example 4)

BJH Nitrogen Desorption Plot of USY and EMY catalysts of Example 5 (after steam deactivation)

| Property: | Test 1: | | Test 2: | | Test 3: | | Average: | | EMY-USY: |
|---|---|---|---|---|---|---|---|---|---|
| | USY | EMY | USY | EMY | USY | EMY | USY | EMY | |
| Cat/Oil | 5.49 | 6.46 | 6.43 | 6.77 | 6.71 | 6.41 | 6.21 | 6.55 | 0.34 |
| Conversion | 71.14 | 72.91 | 73.62 | 74.36 | 74.08 | 74.05 | 72.95 | 73.77 | 0.83 |
| Wet Gas | 17.34 | 17.82 | 19.42 | 19.50 | 19.84 | 19.01 | 18.87 | 18.78 | -0.09 |
| Gasoline (w/C5) | 50.76 | 52.00 | 51.18 | 51.83 | 51.18 | 51.97 | 51.04 | 51.93 | 0.89 |
| LCO | 21.71 | 20.77 | 20.21 | 19.85 | 20.02 | 20.02 | 20.65 | 20.21 | -0.43 |
| Bottoms | 6.52 | 5.70 | 5.78 | 5.49 | 5.51 | 5.57 | 5.94 | 5.59 | -0.35 |
| Coke | 3 | 3 | 3 | 3 | 3 | 3 | 3 | 3 | 0.00 |

FIGURE 9

Process Test Data for USY and EMY Catalysts with $Al_2O_3$ Binder (Example 6)

Process Test Data for USY and EMY Catalysts with $Al_2O_3$ Binder (Example 6)

Process Plant Test Data for USY and EMY Catalysts with $Al_2O_3$ Binder (Example 6)

> US 8,715,487 B2

LOW SMALL MESOPOROUS PEAK CRACKING CATALYST AND METHOD OF USING

CROSS REFERENCE TO RELATED APPLICATIONS

This Application claims the benefit of U.S. Application No. 61/339,928, filed Mar. 11, 2010.

JOINT RESEARCH AGREEMENT

The subject matter claimed in this application was made by or on behalf of a joint research agreement between W. R. Grace & Co.-Conn. and ExxonMobil Research and Engineering. The aforementioned joint development agreement was in effect on or before the date the claimed invention was made, and the claimed invention was made as a result of activities undertaken within the scope of the joint research agreement.

FIELD OF THE INVENTION

This invention relates to the composition, method of making and use of a fluidized catalytic cracking ("FCC") catalyst that is comprised of a new Y zeolite which exhibits an exceptionally low small mesoporous peak height around the 40 Å (angstrom) range as determined by nitrogen adsorption measurements and shown in the BJH $N_2$ Desorption Plot. FCC catalysts made from this new zeolite exhibit improved rates of heavy oil cracking heavy oil bottoms conversions and gasoline conversions.

BACKGROUND

Conversion of high molecular weight petroleum feeds to more valuable products by catalytic processes such as fluidized catalytic cracking is important to petroleum processes. In the fluidized catalytic cracking process, higher molecular weight feeds are contacted with fluidized catalyst particles in the riser reactor of the fluidized catalytic cracking unit. The contacting between feed and catalyst is controlled according to the type of product desired. In catalytic cracking of the feed, reactor conditions such as temperature and catalyst circulation rate are controlled to maximize the products desired and minimize the formation of less desirable products such as light gases and coke.

In the current economics of modern refining, as lighter, easier to convert feedstocks are in increasingly lesser availabilities and higher pricing, refiners are continually moving to ways in which to process the more challenged or "heavier" feedstocks that are more available and can be purchased at a discount as compared to the lighter hydrocarbon feedstocks. These heavier feedstocks tend to have lower API gravities (i.e., denser) and higher viscosities than the lighter hydrocarbon feedstocks. This makes these heavy oil feedstocks, including gas oils and vacuum tower bottoms typically fed to an associated fluidized catalytic cracking (or "FCC") unit more difficult to convert to high value products such as gasoline, and require a higher "conversion rates" in order to reduce the amount of heavy hydrocarbons products, i.e., those products with a boiling point above about 430° F. (221° C.), generated from the cracking process and higher yields of gasoline product.

With the advance of zeolitic cracking catalysts with greatly improved cracking activity, most modern fluidized catalytic cracking reactors utilize a short contact-time cracking configuration. With this configuration, the time in which the catalyst and the fluidized catalytic cracker feedstream are in contact is limited in order to minimize the amount of excessive cracking which results in the increased production of less valued products such as light hydrocarbon gases as well as increased coking deposition on the cracking catalysts. Short contact-time riser reactor designs are relatively new to the petrochemical industry, but have gained wide-spread acceptance and use in the industry due to the ability of optimizing hydrocarbon cracking products and yields in conjunction with the use of modern cracking catalysts.

Conventional FCC catalysts have used type Y zeolites as part of their composition. Type "Y" zeolites are of the faujasite ("FAU") framework type which is described in *Atlas of Zeolitic Framework Types* (Ch. Baerlocher, W. M. Meier, and D. H. Olson editors, 5th Rev. Ed., Elsevier Science B.V., 2001) and in the pure crystalline form are comprised of three-dimensional channels of 12-membered rings. The crystalline zeolite Y is described in U.S. Pat. No. 3,130,007. Zeolite Y (see U.S. Pat. No. 3,130,007) and improved Y-type zeolites such as Ultra Stable Y ("USY" or "US-Y") (see U.S. Pat. No. 3,375,065) not only provide a desired framework for shape selective reactions but also exhibit exceptional stability in the presence of steam at elevated temperatures which has resulted in this zeolite structure being utilized in many catalytic petroleum refining and petrochemical processes. Additionally, the three-dimensional pore channel structure of the faujasite framework zeolites, such as the Y-type zeolites, in combination with their relatively good ability to retain a high surface area under severe hydrothermal conditions and their generally low cost to manufacture makes these zeolites a preferred component for Fluid Catalytic Cracking ("FCC") catalysts in petroleum refining and petrochemical processes.

In a pure zeolite crystal, the pore diameters are typically in the range of a few angstroms in diameter. Y-type zeolites exhibit pore diameters of about 7.4 Angstroms (Å) in the pure crystal form. However, in manufacture, defects in the crystalline structure and in particular in the inter-crystal interfaces occur in the crystalline structure of zeolites, including the Y-type zeolites. Additionally, due to certain methods of preparations and/or use, both wanted and unwanted structural modifications can be made to the zeolite crystal. It is these "defects" which lead to specific properties of the zeolite which may have beneficial properties when utilized in catalytic processes. Conventional Ultra Stable Y (USY) zeolites prepared by mild steam calcination, as taught by U.S. Pat. No. 3,375,065, contain significant amounts of mesopores in the 30 to 50 Å regions. These pores with pore diameters in the 30 to 50 Å range are herein defined as "Small Mesopores".

What are needed in the industry are improved catalysts which have improved heavy improved heavy oil conversion rates as well as improved gasoline yields and lower undesired coke production. In particular, what are needed in the industry are improved fluidized catalytic cracking ("FCC") catalysts that exhibit these properties. Even more preferably desired is fluidized catalytic cracking ("FCC") catalysts that are easy to manufacture that can be used in existing short contact time FCC units with little or no modifications required to the existing unit that exhibit improved conversions and gasoline production properties.

SUMMARY

This invention includes in part the composition, method of making and use of a small mesoporous peak fluidized catalytic cracking ("FCC") catalyst that is comprised of a new Y zeolite which exhibits an exceptionally low small mesoporous peak height around the 40 Å (angstrom) range as measured by nitrogen adsorption and shown in the BJH $N_2$ Desorption Plot. FCC catalysts made from this new zeolite, and as described herein, exhibit improved rates of heavy oil cracking heavy oil bottoms conversions and gasoline conversions. The present invention includes the composition, method of making and use of fluidized catalytic cracking catalysts incorporating an extra mesoporous Y zeolite (termed herein as "EMY" zeolite) which has improved mesoporous properties over Y zeolites of the prior art, as well as a method of making the zeolite and its use in fluidized catalytic cracking process. This zeolite is described herein as well as described further in U.S. Ser. No. 12/584,376 entitled "Extra Mesoporous Y Zeolite", which is incorporated in its entirety herein.

An embodiment of the present invention is a fluidized catalytic cracking catalyst comprised of:
  a Y zeolite with a Large Mesopore Volume of at least about 0.03 $cm^3/g$ and a Small Mesopore Peak of less than about 0.15 $cm^3/g$; and
  an inorganic matrix.

In a preferred embodiment of the fluidized catalytic cracking catalyst of the present invention, the zeolite has a Large-to-Small Pore Volume Ratio of at least about 4.0. In yet another preferred embodiment, the unit cell size of the zeolite is less than about 24.45 Angstroms. In another preferred embodiment, the inorganic matrix is comprised of oxides of silicon, aluminum or combinations thereof. In a most preferred embodiment of the fluidized catalytic cracking catalyst of the present invention, the inorganic matrix is comprised of a peptized alumina. Preferably, the fluidized catalytic cracking catalyst is further comprised of a clay.

In yet another most preferred embodiment of the fluidized catalytic cracking catalyst of the present invention, the fluidized catalytic cracking catalyst has a 40 Å Peak of less than about 0.13 $cm^3/g$.

An embodiment of the present invention is a method of making a low small mesopore peak fluidized catalytic cracking catalyst, comprising the steps of:
  a) combining a binder precursor selected from a silica, an alumina, or a combination thereof, with a clay and a zeolite to form a catalyst mixture; and
  b) drying the catalyst mixture to form a catalyst;
  wherein the zeolite is a Y zeolite with a Large Mesopore Volume of at least about 0.03 $cm^3/g$ and a Small Mesopore Peak of less than about 0.15 $cm^3/g$.

In a preferred embodiment of the method of making the fluidized catalytic cracking catalyst, the binder precursor is selected from a colloidal silica, silica gel, a silica sol, or a combination thereof. In yet another preferred method of making, the binder precursor is selected from a colloidal alumina, alumina gel, a silica sol, or a combination thereof. Preferably, the binder precursor is comprised of peptized alumina. In another preferred method of making, the catalyst mixture comprises an alumina and a silica. In yet another preferred embodiment of the method of making the fluidized catalytic cracking catalyst of the present invention, the clay is selected from kaolin, bentonite, and combinations thereof.

In another embodiment of the present invention is a fluidized catalytic cracking (or "FCC") process for catalytically cracking a hydrocarbon feedstock, comprising:
  a) contacting the hydrocarbon feedstock with a fluidized catalytic cracking catalyst comprised of a Y zeolite with a Large Mesopore Volume of at least about 0.03 $cm^3/g$ and a Small Mesopore Peak of less than about 0.15 $cm^3/g$; and an inorganic matrix; and
  b) producing at least one product stream which has a lower average molecular weight than the hydrocarbon feedstock;
  wherein the zeolite has a Large Mesopore Volume of at least about 0.03 $cm^3/g$, and a Small Mesopore Peak of less than about 0.15 $cm^3/g$.

In another preferred embodiment, the petroleum refining process is performed at hydrocarbon cracking catalyst at cracking conditions comprising temperatures from about 1000° F. to about 1500° F. (538° C. to 816° C.); catalyst to feed (wt/wt) ratios from about 2 to 10; and riser reaction zone catalyst/hydrocarbon contact durations of less than about 5 seconds.

BRIEF DESCRIPTION OF THE DRAWINGS

FIG. 5 shows the catalyst property data associated with the LS-USY, LS-EMY, ULS-USY, and ULS-EMY $SiO_2$ matrix catalysts samples of Example 3.

FIG. 9 is a table of the process test data from the USY and EMY $Al_2O_3$ matrix catalyst sample testing of Example 6.

DETAILED DESCRIPTION OF THE EMBODIMENTS

Figure 1:
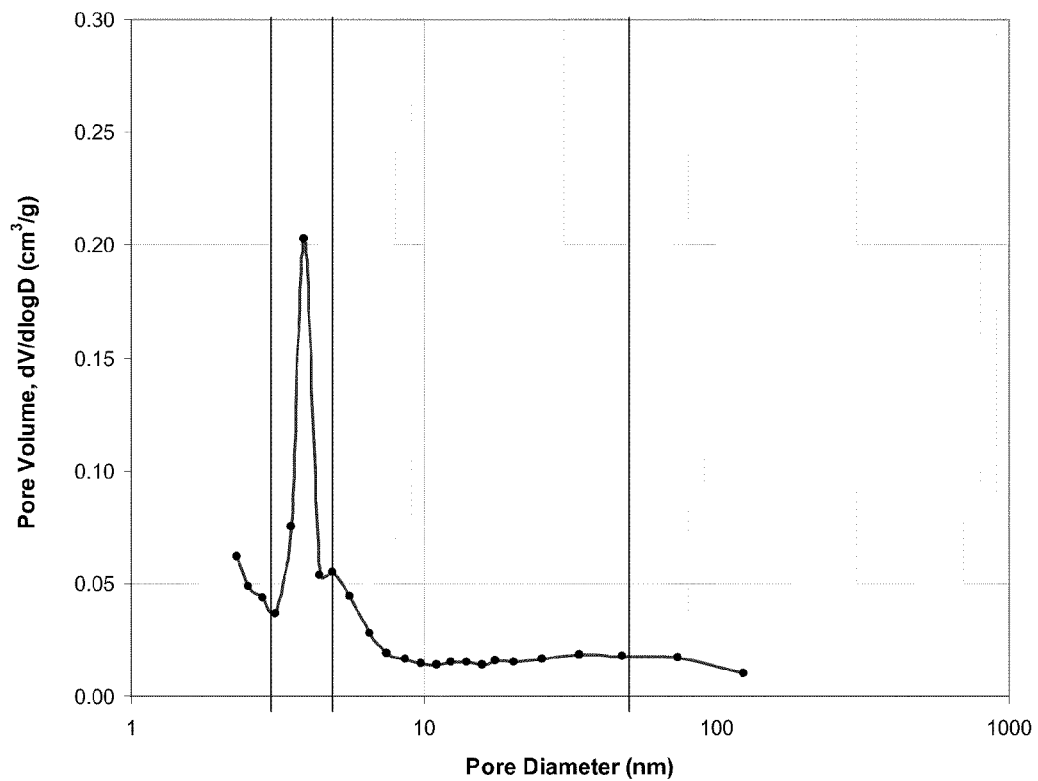
FIG. 1 is a BJH $N_2$ Desorption Plot of a USY zeolite from a commercially available ammonium-Y zeolite (prior art).

The fluidized catalytic cracking ("FCC") catalyst of the present invention incorporates the use of an Extra Mesoporous Y ("EMY") zeolite and its use in hydrocarbon cracking catalysts. This zeolite is described herein as well as described further in U.S. Ser. No. 12/584,376 entitled "Extra Mesoporous Y Zeolite", which is incorporated in its entirety herein. The catalysts herein comprising this new zeolite have been unexpectedly found to have improved hydrocarbon conversions, including improved gasoline yields, particularly when utilized in a fluidized catalytic cracking ("FCC") process of the present invention.

In the fluidized catalytic cracking catalysts of the present invention is utilized what is termed herein as an EMY zeolite which is a newly developed Y-type zeolite with a suppressed "small mesopore peak" that is commonly found associated within the "small mesopores" (30 to 50 Å pore diameters) of commercial Y-type zeolites, while maintaining a substantial volume of pores in the "large mesopores" (greater than 50 to 500 Å pore diameters) of the zeolite. International Union of Pure and Applied Chemistry ("IUPAC") standards defines "mesopores" as having pore diameters greater than 20 to less than 500 Angstroms (Å). However, the standard nitrogen desorption measurements as used herein do not provide pore volume data below about 22 Å. Additionally, since the "small mesopore peak" found in Y zeolites are substantially confined between the 30 and 50 Å ranges, it is sufficient to define the measurable mesoporous pore diameter range for the purposes of this invention as pore diameters from 30 to 500 Angstroms (Å).

Therefore, as utilized herein, the terms "Small Mesopore(s)" or "Small Mesoporous" are defined as those pore structures in the zeolite crystal with a pore diameter of 30 to 50 Angstroms (Å). Similarly, the terms "Large Mesopore(s)" or "Large Mesoporous" as utilized herein are defined as those pore structures in the zeolite crystal with a pore diameter of greater than 50 to 500 Angstroms (Å). The terms "Mesopore(s)" or "Mesoporous" when utilized herein alone (i.e., not in conjunction with a "small" or "large" adjective) are defined herein as those pore structures in the zeolite crystal with a pore diameter of 30 to 500 Angstroms (Å). Unless otherwise noted, the unit of measurement used for mesoporous pore diameters herein is in Angstroms (Å).

The term "Small Mesopore Volume" or "Small Mesoporous Volume" of a material as used herein is defined as the total pore volume of the pores per unit mass in the Small Mesopore range as measured and calculated by ASTM Standard D 4222 "Determination of Nitrogen Adsorption and Desorption Isotherms of Catalysts and Catalyst Carriers by Static Volumetric Measurements"; ASTM Standard D 4641 "Calculation of Pore Size Distributions of Catalysts from Nitrogen Desorption Isotherms"; and "The Determination of Pore Volume and Area Distributions in Porous Substances, I. Computations from Nitrogen Isotherms", by Barrett, E. P.; Joyner, L. S.; and Halenda, P. P.; *Journal of American Chemical Society*; vol. 73, pp. 373-380 (1951), all of which are incorporated herein by reference. Unless otherwise noted, the unit of measurement for mesopore volume is in $cm^3/g$.

The term "Large Mesopore Volume" or "Large Mesoporous Volume" of a material as used herein is defined as the total pore volume of the pores per unit mass in the Large Mesopore range as measured and calculated by ASTM Standard D 4222 "Determination of Nitrogen Adsorption and Desorption Isotherms of Catalysts and Catalyst Carriers by Static Volumetric Measurements"; ASTM Standard D 4641 "Calculation of Pore Size Distributions of Catalysts from Nitrogen Desorption Isotherms"; and "The Determination of Pore Volume and Area Distributions in Porous Substances, I. Computations from Nitrogen Isotherms", by Barrett, E. P.; Joyner, L. S.; and Halenda, P. P.; *J. Amer. Chem. Soc.; vol.* 73, pp. 373-380 (1951). Unless otherwise noted, the unit of measurement for mesopore volume is in $cm^3/g$.

The term "Large-to-Small Pore Volume Ratio" or "LSPVR" of a material as used herein is defined as the ratio of the Large Mesopore Volume to the Small Mesopore Volume (dimensionless).

The term "BJH $N_2$ Desorption Plot" as used herein is defined as a plot of the change in unit volume of a mesoporous material as a function of the pore diameter of the mesoporous material. Herein, the "BJH $N_2$ Desorption Plot" is shown as the pore volume calculated as dV/dlogD (in $cm^3/g$) vs. the pore diameter (in nanometers) as determined by the ASTM Standard D 4222, ASTM Standard D 4641, and "The Determination of Pore Volume and Area Distributions in Porous Substances, I. Computations from Nitrogen Isotherms", by Barrett, E. P.; Joyner, L. S.; and Halenda, P. P.; *Journal of American Chemical Society; vol.* 73, pp. 373-380 (1951), (i.e., the "BJH method" for calculating the pore distribution of a porous substance) as referenced in the definitions above.

The BJH $N_2$ Desorption Plot should be generated from approximately 15 to 30 data points at approximately equidistant positions on a logarithmic x-axis of the pore diameter (nanometers) between the values of 3 to 50 nanometers (30 to 500 Å). The pore volume value on the y-axis of the plot is commonly calculated in industry equipment as an interpolated value of the incremental change in volume, dV (where V is in $cm^3$, and dV is in $cm^3$) divided by the incremental change in the log of the pore diameter, dlogD (where D is in nanometers, and dlogD is unitless) and is adjusted to the unit weight of the sample in grams. Therefore, the "pore volume" (which is the common term utilized in the industry) as shown on the y-axis of the BJH $N_2$ Desorption Plot may be more appropriately described as an incremental pore volume per unit mass and is expressed herein in the units $cm^3/g$. It should be noted that the "pore volume" value on the y-axis of the BJH $N_2$ Desorption Plot is not synonymous with the "Small Mesopore Volume" and "Large Mesopore Volume" as described above which are calculated unit pore volumes over a range of pore diameters. However, these calculations and terms as used herein are familiar to those of skill in the art. All measurements and data plots as utilized herein were made with a Micromeritics® Tristar 3000® analyzer.

The term "Small Mesopore Peak" as used herein refers to the property of a zeolite and is defined as the maximum pore volume value calculated as dV/dlogD (y-axis) on a BJH $N_2$ Desorption Plot as described above (pore volume vs. pore diameter) between the 30 Å and 50 Å pore diameter range (x-axis). Unless otherwise noted, the unit of measurement for the small mesopore peak is in $cm^3/g$.

The term "40 Å Peak" or "40 Å Peak Height" as used herein refers to the property of a catalyst and is defined as the maximum pore volume value calculated as dV/dlogD (y-axis) on a BJH $N_2$ Desorption Plot as described above (pore volume vs. pore diameter) at 40 Å pore diameter x-axis). Unless otherwise noted, the unit of measurement for the 40 Å Peak is in $cm^3/g$.

The term "Large Mesopore Peak" used herein refers to the property of a zeolite and is defined as the maximum pore volume value calculated as dV/dlogD (y-axis) on a BJH $N_2$ Desorption Plot as described above (pore volume vs. pore diameter) between the 50 Å and 500 Å pore diameter range x-axis). Unless otherwise noted, the unit of measurement for the large mesopore peak is in $cm^3/g$.

The term "BET Surface Area" for a material as used herein is defined as the surface area as determined by ASTM Specification D 3663. Unless otherwise noted, the unit of measurement for surface area is in $m^2/g$.

The term "Unit Cell Size" for a material as used herein is defined as the unit cell size as determined by ASTM Specification D 3942. Unless otherwise noted, the unit of measurement used for unit cell size herein is in Angstroms (Å).

While not wishing to be held to any specific theory, it is believed herein that a problem that exists with the existing Y zeolites in the industry in that some of these Y-type zeolites (e.g., Na—Y zeolites), while widely used in the industry, exhibit a "peak" in the small mesopore range (30 to 50 Å pore diameters) while exhibiting no significant pore volume associated with the large mesopore range (50 to 500 Å pore diameters). Conversely, other Y-type zeolites (e.g., USY zeolites), exhibit a significant "peak" in the small mesopore range (30 to 50 Å pore diameters) when some large mesopores are present. It is believed and is discovered herein that the pore volume in the small mesopore range (30 to 50 Å pore diameters) of these zeolite contributes to unwanted adverse conversion effects when utilized in hydrocarbon cracking processes.

As discussed, conventional Y zeolites contain a significant volume associated with pores in the range of 30 to 50 Å diameter, which are easily observed by a standard nitrogen adsorption-desorption test as interpreted by the BJH method. FIG. 1 shows a typical the BJH $N_2$ Desorption Plot of a typical USY zeolite. As can be seen in FIG. 1, the USY exhibits a high volume of pores in the "small mesoporous" range (30 to 50 Å pore diameter) as well as a significant "small mesopore peak" in the BJH $N_2$ Desorption Plot of about 0.20 cm³/g or more in this small mesopore range. This high peak in the 30 to 50 Å pore diameter range of the BJH $N_2$ Desorption Plot is a common feature for Y-zeolite materials that possess a significant pore volume in the mesoporous range (30 to 500 Å pore diameters). This peak exhibited in the BJH $N_2$ Desorption Plot of the Y zeolites is termed herein as the "Small Mesopore Peak" of the zeolite and is defined above. Without wishing to be held to any theory, it is believed that this phenomenon occurs due to a "bottlenecking" of some of the mesoporous structures in the zeolite creating an ink-bottle effect wherein a significant amount of the nitrogen inside the internal pore cavities cannot be released during the desorption phase of the test until the partial pressure is reduced below the point associated with this small mesopore peak point. Typically in a standard nitrogen adsorption/desorption test this peak is associated at a point in the desorption branch at a relative nitrogen pressure ($P/P_0$) of about 0.4 to about 0.45. See "Characterization of Porous Solids and Powders: Surface Area, Pore Size and Density", by Lowell, S., Shields, J. E., Thomas, M. A., and Thommes, M., pp. 117-123, (Springer, Netherlands 2006), which is incorporated herein by reference.

As can further be seen in FIG. 1, there is no significant "large mesopore peak" associated with the large mesoporous structure (50 to 500 Å pore diameter range) of the USY zeolite. The USY sample of this example is further described in Example 1. While USY zeolites do not possess a significant volume of large mesopores (in the 50 and 500 Å diameter range) upon fabrication, they may develop these large mesopores upon steaming at high temperatures. A common test in the industry is to contact the zeolite with a high temperature steam (for example, 100% partial pressure steam at 1400° F. for 16 hours) to determine the hydrothermal stability of the zeolite. This test is designed to simulate the steaming conditions of a FCC unit wherein the catalysts are typically exposed to steam at elevated temperatures to represent conditions under which the FCC catalysts will be commercially exposed. The main reason for this test is to determine the ability of the zeolite to retain surface area when exposed to steam at high temperatures. However, upon severe steaming, Y-type zeolites also tend to increase the pore volume associated with the large mesopores, and the surface area of the zeolite tends to diminish as the steaming conditions become more severe.

Figure 2:
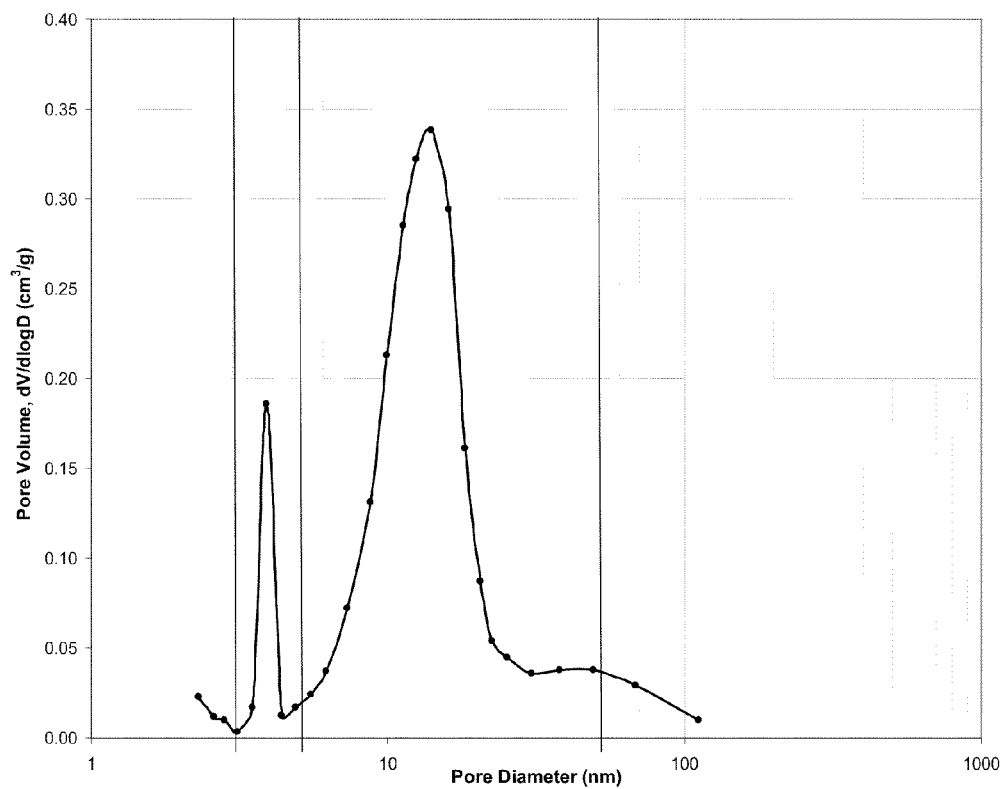
FIG. 2 is a BJH $N_2$ Desorption Plot of the USY zeolite of FIG. 1 (prior art) after it has been subjected to ion exchange/calcination steps and long-term deactivation steaming at 1400° F. for 16 hours.

According to the details of Example 1, a conventional USY sample as described above and shown in FIG. 1 was further ammonium ion-exchanged three times and then steamed at 1400° F. for 16 hours to determine the resulting pore distribution and surface area stability of the USY zeolite under these hydrothermal conditions. FIG. 2 shows the BJH $N_2$ Desorption Plot of the ion-exchanged USY zeolite after long-term deactivation steaming. As can be seen from FIG. 2, the steamed USY develops a "large mesopore peak" in the large mesoporous structures (50 to 500 Å pore diameter range) of the zeolite. However, as also can be seen in FIG. 2, the "small mesopore peak", associated with pores in the 30 to 50 Å pore diameter range of the steamed USY, is not significantly decreased as compared to the small mesopore peak of the un-steamed USY sample as shown in FIG. 1. Here, the small mesopore peak of the steamed USY is about 0.19 cm³/g.

While not wishing to be held to any theory, it is believed that the small and large mesoporous pore structures of the zeolite are created by defects and/or deterioration of the zeolite crystalline structure, thereby creating structural defect voids (or equivalent "pores") that are larger in size than those of the as-synthesized (pure crystal) structure of the zeolite.

The fluidized catalytic cracking catalysts of the present invention utilize a highly hydrothermally stable Y-zeolite that has a significantly suppressed small mesopore peak in both the as-fabricated and as-steamed conditions while maintaining a high volume of large mesopores (50 to 500 Å pore diameter range). In another embodiment of the present invention, is a catalyst comprised of a highly hydrothermally stable Y-zeolite that has a significantly suppressed small mesopore peak in both the as-fabricated and as-steamed conditions while maintaining a high ratio of large-to-small mesoporous volume. The zeolite utilized in the catalysts of this invention is termed herein as an "Extra Mesoporous Y" (or "EMY") zeolite.

In an embodiment of the fluidized catalytic cracking catalysts of the present invention, is utilized an EMY zeolite, which can be obtained from a starting material of a conventional Na—Y type zeolite with a sodium oxide ($Na_2O$) content of about 10 to 15 wt %. In an embodiment of the present invention, the EMY zeolite precursor is ammonium-exchanged to lower the $Na_2O$ content to a desired level for the production of an EMY zeolite. Generally, about one to about three ammonium-exchanges are required to reduce the $Na_2O$ content of a typical Na—Y precursor to a desired level for the production of an EMY zeolite. Based on fabrication testing, it is believed by the inventor at this time that the sodium level of the EMY precursor must be maintained in certain ranges in order to obtain an EMY zeolite. In a preferred embodiment of the present invention, the $Na_2O$ content of the ammonium-exchanged Na—Y zeolite precursor is brought to about 2.0 to about 5.0 wt % $Na_2O$. More preferably, the $Na_2O$ content of the ammonium-exchanged Na—Y zeolite precursor is brought to about 2.3 to about 4.0 wt % $Na_2O$. In this preferred embodiment, it is believed that the number of ion-exchange steps performed is not essential to the formation of EMY as long as the $Na_2O$ content of the EMY precursor is within a desired range. Unless otherwise noted, the $Na_2O$ content is as measured on the zeolite precursor prior to high temperature steam calcination and reported on a dry basis.

The EMY precursors or the final EMY zeolite may also be rare earth exchanged to obtain a rare earth exchanged EMY or "RE-EMY" zeolite. The zeolites may be rare earth exchanged in accordance with any ion-exchange procedure known in the art. It should also be noted that the weight percentages used herein are based on the dry weight of the zeolite materials.

The ammonium-exchanged Na—Y precursor thus obtained is subjected to a very rapid high temperature steam calcination. In this high temperature steam calcination process, the temperature of the steam is from about 1200 to about 1500° F. More preferably the temperature of the steam is from about 1200 to about 1450° F., more preferably from about 1250 to about 1450° F., and even more preferably from about 1300 to about 1450° F. These high temperature steam calcination temperatures for the production of an EMY zeolite are generally higher than those used in the production of conventional USY zeolites which are high temperature steam calcined at temperatures from about 1000 to about 1200° F. and do not undergo the rapid heating in the high temperature calcination step as the EMY zeolites of the present invention.

It has been discovered that it is important in achieving the EMY zeolite structure that the zeolite precursor be brought up close to the desired steaming temperature in a very rapid manner. The temperature of the zeolite during the steaming process may be measured by a thermocouple implanted into the bed of the EMY zeolite precursor.

In a preferred embodiment of making the EMY zeolite, the temperature of the zeolite is raised from a standard pre-calcination temperature to within 50° F. (27.8° C.) of the steam temperature during the high temperature steam calcination step in less than about 5 minutes. In a more preferred embodiment of making the EMY zeolite, the temperature of the zeolite is raised from a standard pre-calcination temperature to within 50° F. (27.8° C.) of the steam temperature during the high temperature steam calcination step in less than about 2 minutes. Although not critical to the fabrication process and not so limited as to the claimed invention herein, typically the pre-calcination temperature in a Y-type zeolite manufacturing process is from about 50° F. to about 300° F.

Figure 3:
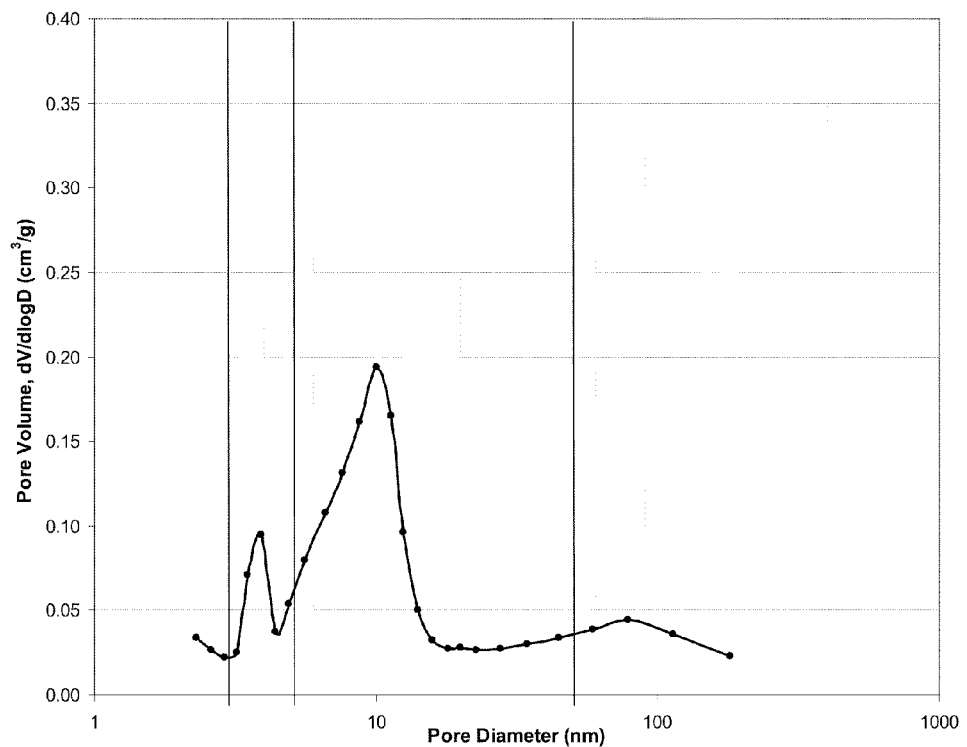
FIG. 3 is a BJH $N_2$ Desorption Plot of an embodiment of an Extra Mesoporous Y ("EMY") zeolite as utilized in the catalysts of the present invention.

Example 2 herein describes the synthesis of one embodiment of an Extra Mesoporous Y ("EMY") zeolite. FIG. 3 shows the BJH $N_2$ Desorption Plot of the EMY zeolite sample from Example 2 prior to additional ammonium exchange and long-term deactivation steaming. As can be seen in FIG. 3, the EMY zeolite exhibits a very low volume of pores in the "small mesoporous" range (30 to 50 Å pore diameter) as well as a very low "small mesopore peak" of about 0.09 cm$^3$/g in this small mesopore range. In comparing FIG. 1 (USY zeolite) and FIG. 3 (EMY zeolite) it should be noted that this "small mesopore peak" has been substantially depressed in the EMY zeolite. It can be seen in FIG. 1 that this small mesopore peak is about 0.20 cm$^3$/g for the USY as compared to the small mesopore peak of about 0.09 cm$^3$/g for the EMY as shown in FIG. 3.

As can further be seen in FIG. 3, there is beneficially a significant "large mesopore peak" associated mainly with the large mesoporous structures (50 to 500 Å pore diameter range) of the EMY zeolite. Comparing this to the BJH $N_2$ Desorption Plot of the USY zeolite in FIG. 1, it can be seen that the EMY zeolite in FIG. 3 exhibits a significant large mesopore peak of about 0.19 cm$^3$/g whereas the USY zeolite in FIG. 1 shows no significantly comparable large mesopore peak in this range.

The pore volumes in each of the ranges, 30 to 50 Angstroms as well as 50 to 500 Angstroms were determined by utilizing the pore volume data from the BJH $N_2$ Desorption tests and interpolating the data to the necessary endpoints. This method for calculating the pore volumes is explained in detail in Example 1 and the same method for calculating the pore volumes was utilized throughout all examples herein. The method as described therein defines how to interpret and calculate the pore volume values of the zeolites within each of the defined pore diameter ranges.

The "small mesopore" and "large mesopore" pore volumes and the BET surface areas for the USY and EMY zeolites of FIGS. 1 and 3, respectively, were measured and are shown in Table 1 as follows:

TABLE 1

Zeolite Properties prior to Long-Term Steaming

| Zeolite | Small (30-50 Å) Mesopore Volume (cm$^3$/g) | Large (50-500 Å) Mesopore Volume (cm$^3$/g) | Large-to-Small Pore Volume Ratio | Small Mesopore Peak, dV/dlogD (cm$^3$/g) | BET Surface Area (m$^2$/g) | Unit Cell Size (Å) |
|---|---|---|---|---|---|---|
| USY (FIG. 1) | 0.0193 | 0.0195 | 1.01 | 0.20 | 811 | 24.55 |
| EMY (FIG. 3) | 0.0109 | 0.0740 | 6.79 | 0.09 | 619 | 24.42 |

It should be noted that FIGS. 1 and 3, as well as the data in Table 1, reflect the USY and EMY zeolite samples after the high temperature steam calcination step and prior to any subsequent treating. As can be seen in Table 1, the volume of small mesopores is larger in the USY zeolite than in the EMY zeolite. However, it can also be seen that the volume of large mesopores in the EMY zeolite is significantly larger than the volume of large mesopores in the USY zeolite. As discussed, it is desired to lower the amount of pore volume in the small mesopore range and increase the amount of pore volume in the large mesopore range of the zeolite. Therefore, an important characteristic of the zeolite is the ratio of the large mesopore volume ("LMV") to the small mesopore volume ("SMV") of the subject zeolite. We term this ratio of the LMV:SMV as the "Large-to-Small Pore Volume Ratio" or "LSPVR" of the zeolite.

As can be seen from Table 1, the Large-to-Small Pore Volume Ratio or "LSPVR" of the sample USY zeolite is about 1.01 wherein the LSPVR of the sample EMY zeolite is about 6.79. This is a significant shift in the Large-to-Small Pore Volume Ratio obtained by the present invention. In a preferred embodiment, the LSPVR of the EMY is at least about 4.0, more preferably at least about 5.0, and even more preferably, the LSPVR of the EMY is at least about 6.0 immediately after the first high temperature steam calcination step as described herein.

Additionally, the EMY zeolites of the present invention may be used in processes that are not subject to exposure to high temperature hydrothermal conditions. It can be seen from Table 1, that one of the remarkable aspects of the EMY zeolites of the present invention is that they exhibit very high Large Mesopore Volumes as compared to the comparable USY of the prior art. This characteristic of the EMY zeolites of the present invention can be valuable to many commercial processes. In preferred embodiments, the as-fabricated EMY zeolites of the present invention have a Large Mesopore Volume of at least 0.03 cm$^3$/g, more preferably at least 0.05 cm$^3$/g, and even more preferably at least 0.07 cm$^3$/g.

As utilized herein, the term "as-fabricated" or "as-fabricated zeolite" of the present invention is defined as the zeolite and its properties as obtained directly after the high temperature steam calcination step (i.e., when the EMY zeolite is formed). As one of skill in the art will be aware, subsequent additional steps (e.g., further ion-exchange) can be performed on the zeolite after forming what is considered the EMY zeolite herein. Unless otherwise stated herein or in the claims, the zeolite properties are measured and defined herein as of this "as-fabricated" point in the fabrication process. As is known to one of skill in the art, the "long-term deactivation steaming" referred to herein is generally utilized as a tool to test the ability of the as-fabricated zeolite to withstand hydrothermal conditions and is not considered as a part of the fabrication of the zeolite.

It should also be noted that it is obvious to those of skill in the art that long-term deactivation steaming will tend to increase the Large Mesopore Volume of typical Y zeolites. However, this unusual aspect of the EMY zeolites of the present invention of possessing such a significantly increased Large Mesopore Volume prior to long-term deactivation steaming can be useful in processes wherein high temperature hydrothermal conditions are not present or even more importantly in processes wherein it is undesired for the fabricated zeolite to be long-term steam deactivated. The as-fabricated EMY zeolite possesses higher BET surface areas as compared to the BET surface areas after the log-term steam deactivation and the as-fabricated EMY zeolite may be more stable in some applications than that the EMY zeolite obtained after long-term steam deactivation.

It can also be seen from comparing FIG. 1 (USY zeolite sample) and FIG. 3 (EMY zeolite sample) that the small mesopore peak in the 30 to 50 Å pore diameter range is significantly lower for the EMY zeolite than the USY zeolite. In a preferred embodiment, the as-fabricated EMY zeolite obtained following the high temperature steam calcination exhibits a Small Mesopore Peak of less than about 0.15 cm$^3$/g. In a more preferred embodiment, the EMY zeolite has a Small Mesopore Peak of less about 0.13 cm$^3$/g, and in an even more preferred embodiment, the Small Mesopore Peak of the EMY is less than about 0.11 cm$^3$/g. The Small Mesopore Volume Peak as defined prior is the maximum value (or peak) of the pore volume value (dV/dlogD, y-axis) exhibited on the BJH N$_2$ Desorption Plot in the 30 to 50 Angstroms (Å) pore diameter range.

In addition, the EMY materials of the present invention exhibit smaller unit cell sizes as compared to similar USY materials that have undergone a single high temperature steam calcination step. As can be seen in Table 1, the USY zeolite of Example 1 has a unit cell size of about 24.55 Å, while the EMY zeolite prepared from similar starting materials has a significantly lower unit cell size of about 24.42 Å.

It has been discovered that in preferred embodiments, these as-fabricated EMY zeolites exhibit unit cell sizes that are less than 24.45 Å. Preferably, the as-fabricated EMY zeolites exhibit unit cell sizes ranging from about 24.37 to about 24.47 Å after the first high temperature steam calcination step as described herein. In even more preferred embodiments, the as-fabricated EMY zeolites have low unit cells size from about 24.40 to about 24.45 Å after the first high temperature steam calcination step as described herein. This smaller unit cell size generally results in a more stable zeolite configuration due to the higher framework silica/alumina ratios reflected by the lower unit cell sizes of EMY zeolite.

The USY zeolite sample as described in Example 1 and shown in the BJH N$_2$ Desorption Plot of FIG. 1 as well as the EMY zeolite sample as described in Example 2 and shown in the BJH N$_2$ Desorption Plot of FIG. 3 were further ammonium ion-exchanged and then long-term deactivation steamed at 1400° F. for 16 hours to determine the long-term hydrothermal stability of the USY and EMY zeolites.

Figure 4:
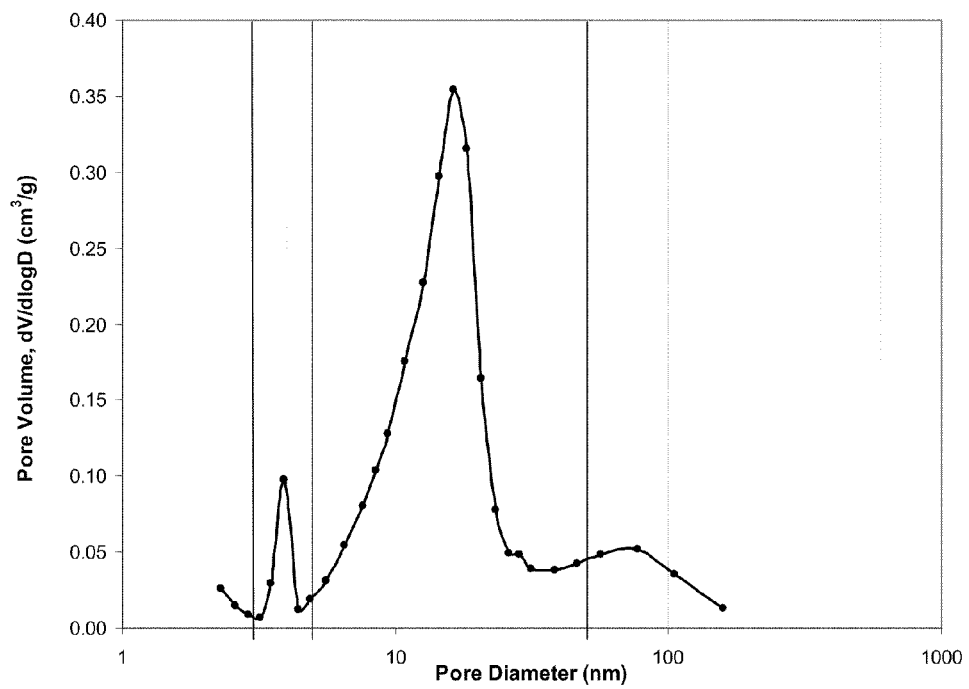
FIG. 4 is a BJH $N_2$ Desorption Plot of an embodiment of an Extra Mesoporous Y ("EMY") zeolite after it has been subjected to ion-exchange/calcination steps and long-term deactivation steaming at 1400° F. for 16 hours.

FIG. 2 shows the BJH N$_2$ Desorption Plot of the ion-exchanged USY zeolite of the prior art after long-term deactivation steaming. FIG. 4 shows the BJH N$_2$ Desorption Plot of the ion-exchanged EMY zeolite of an embodiment of the present invention after long-term deactivation steaming. As can be seen from FIG. 4, the Large Mesopore Peak of the EMY zeolite increased desirably from about 0.19 cm$^3$/g (as shown in FIG. 3) to about 0.36 cm$^3$/g (as shown in FIG. 4) after long-term deactivation steaming. Just as desirable, following long-term deactivation steaming of the EMY zeolite, the Small Mesopore Peak of the EMY zeolite was not significantly increased. The Small Mesopore Peak of the EMY zeolite remained essentially constant at about 0.10 cm$^3$/g (as shown in FIGS. 3 and 4).

In contrast, in the comparative USY zeolite of the prior art, the Small Mesopore Peak remained undesirably high at about 0.19 cm$^3$/g after long-term deactivation steaming (see FIG. 2).

The physical properties of the zeolites obtained after long-term deactivation steaming in Examples 1 and 2 are tabulated in Table 2 below. In Table 2 below, are shown the "Small Mesopore Volumes", the "Large Mesopore Volumes, the "Large-to-Small Pore Volume Ratios", and the Small Mesopore Peaks" for the USY and EMY zeolites illustrated in FIGS. 2 and 4, respectively, as well as the associated BET surface areas and the unit cell sizes as measured following three ammonium ion-exchanges and long-term deactivation steaming at 1400° F. for 16 hours.

TABLE 2

Zeolite Properties after Long-Term Deactivation Steaming

| Zeolite | Small (30-50 Å) Mesopore Volume (cm$^3$/g) | Large (50-500 Å) Mesopore Volume (cm$^3$/g) | Large-to-Small Pore Volume Ratio | Small Mesopore Peak, dV/dlogD (cm$^3$/g) | BET Surface Area (m$^2$/g) | Unit Cell Size (Å) |
|---|---|---|---|---|---|---|
| USY (FIG. 2) | 0.0112 | 0.1211 | 10.85 | 0.19 | 565 | 24.27 |
| EMY (FIG. 4) | 0.0077 | 0.1224 | 15.97 | 0.10 | 587 | 24.27 |

Another benefit of the EMY zeolites of the present invention is surface area stability. As can be seen in Table 2, the BET surface area for the long-term deactivation steamed EMY zeolite sample was greater than the BET surface area for the USY sample. Additionally, the EMY retained a higher percentage of the surface area after the three ammonium ion exchanges and long-term deactivation steaming at 1400° F. for 16 hours. Comparing Table 1 Table 2, the USY retained about 70% of its original surface area wherein the EMY retained about 95% of its original surface area, indicating the superior hydrostability of the EMY zeolites of the present invention. In preferred embodiments of the present invention, the EMY zeolite has BET Surface Area of at least 500 m$^2$/g as measured either before long-term deactivation steaming at 1400° F. for 16 hours or after long-term deactivation steaming at 1400° F. for 16 hours.

In a preferred embodiment, the "Large-to-Small Pore Volume Ratio" (or "LSPVR") of the EMY is at least about 10.0, more preferably at least about 12.0, and even more preferably, the LSPVR of the EMY is at least about 15.0 after long-term deactivation steaming at 1400° F. for 16 hours.

In the present invention, the EMY zeolite as described is incorporated into the cracking catalysts of the present invention and tested under fluidized catalytic cracking ("FCC") conditions. Comparative FCC cracking catalysts were fabricated from comparable low sodium-USY zeolite catalysts ("LS-USY") as well ultralow sodium-USY zeolite catalysts ("ULS-USY") as of the prior art and embodiments of the low sodium-EMY zeolite catalysts ("LS-EMY") and ultralow sodium-EMY zeolite catalysts ("ULS-EMY") of the present invention as detailed in Example 3 herein. All of these catalysts were made with a matrix comprised of 21 wt % silicon oxide (SiO$_2$), 39 wt % clay, and 40 wt % either USY or EMY zeolite.

The properties of the fresh catalysts and steam-deactivated catalysts from Example 3 are shown in the table in FIG. 5 for the LS-USY, LS-EMY, ULS-USY, and ULS-EMY catalysts made. In particular, it should be noted that while many of the physical properties between the USY and EMY catalysts do not show significant differences, the EMY catalysts of the present invention exhibit a significantly lower "N2 BJH: 40 Å Peak Heights" as compared to the comparable USY catalysts. It is this differentiating feature that is believed to be directly related to the improved hydrocarbon processing results achieved in the following example.

As shown in Example 4, after steam deactivation of the sample catalysts at 1465° F. for 20 hours, two samples of the low sodium-USY zeolite catalysts ("LS-USY") of the prior art were tested under typical FCC conditions in a pilot plant and the results compared to testing under the same conditions of a comparable low sodium-EMY zeolite catalyst ("LS-EMY") catalyst of the present invention. The test results were normalized to a constant coke yield of 3 wt % as a standard for comparison as many units are coke and heat limited.

Figure 6A:
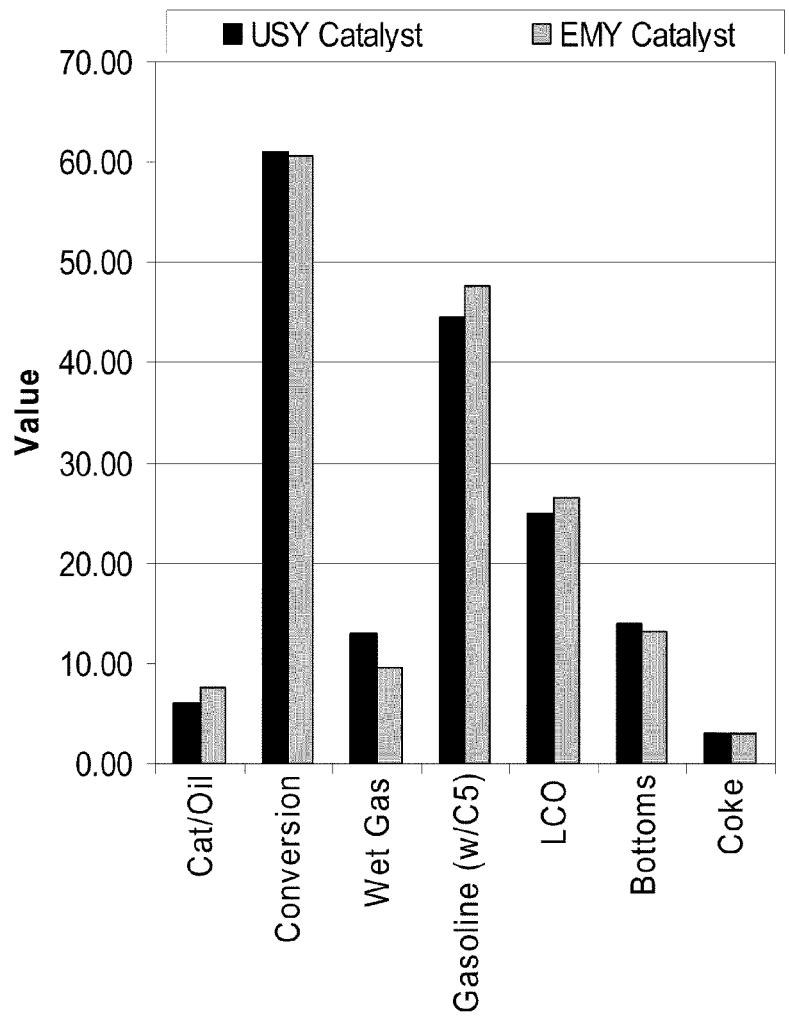
FIGS. 6A and 6B are graphs comparing the process test data from the LS-USY and LS-EMY catalyst sample testing of Example 4.
Figure 6B:
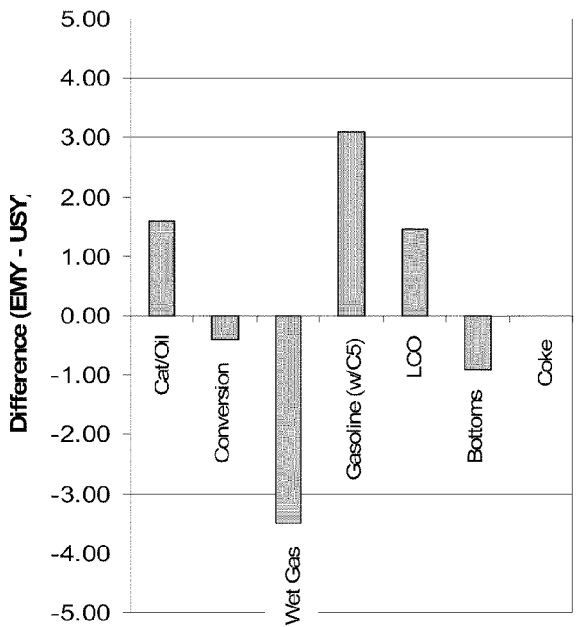

As can be seen in FIG. 6A and particularly FIG. 6B (which illustrates the % difference in values between the LS-USY and LS-EMY data in FIG. 6A), a higher catalyst-to-oil ratio for LS-EMY than LS-USY is utilized at constant coke yield. However, this is not an important factor as most units have the ability to adjust the catalyst-to-oil ratio in an FCC unit with little impact on overall unit economics. As can be seen in FIG. 6B, except for a slight decrease in overall conversion. All of the other product variables have been improved. There is a substantial beneficial decrease in both wet gas and bottoms yields, as well as a substantial beneficial increase in both gasoline and light cycle oil ("LCO") yields with an LS-EMY catalyst of the present invention as compared to LS-USY catalysts.

Also as shown in Example 4, after steam deactivation of the sample catalysts at 1465° F. for 20 hours, two samples of the ultralow sodium-USY zeolite catalysts ("ULS-USY") of the prior art were tested under typical FCC conditions in a pilot plant and the results compared to testing under the same conditions of a comparable ultralow sodium-EMY zeolite catalyst ("ULS-EMY") catalyst of the present invention. The test results were also normalized to a constant coke yield of 3 wt %.

Figure 7A:
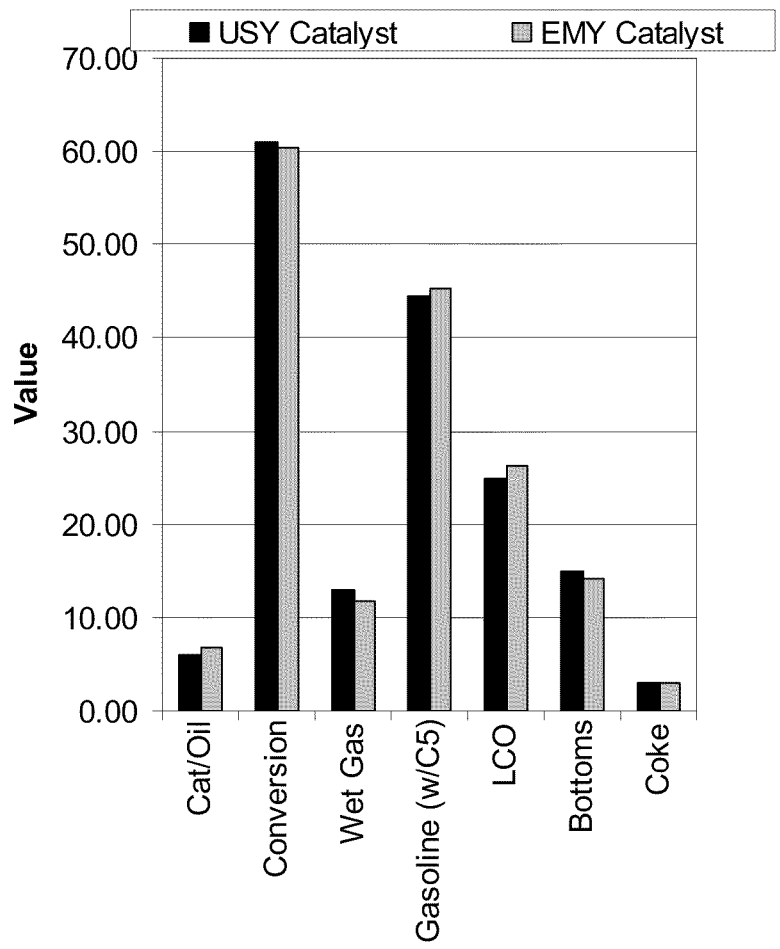
FIGS. 7A and 7B are graphs comparing the process test data from the ULS-USY and ULS-EMY catalyst sample testing of Example 4.
Figure 7B:
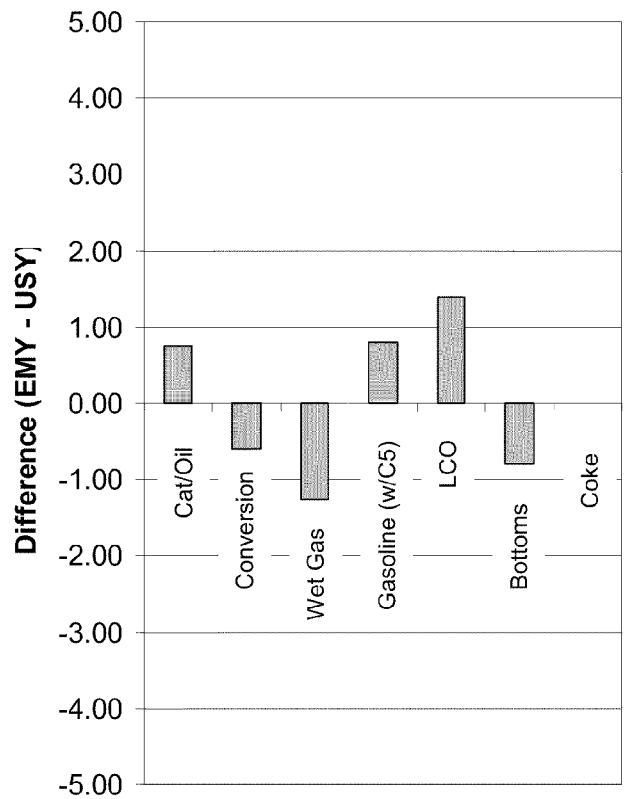

As can be seen in FIG. 7A and particularly FIG. 7B (which illustrates the difference in values between the ULS-EMY relative to the ULS-USY data in FIG. 7A), similar results/trends were experienced for the ULS-EMY than ULS-USY as from the LS-EMY than LS-USY shown in FIGS. 6A and 6B. Similar trends were experienced in all of the measured/calculated variables, including a substantial beneficial decrease in both wet gas and bottoms yields, as well as a substantial beneficial increase in both gasoline and light cycle oil ("LCO") yields with an ULS-EMY catalyst of the present invention as compared to ULS-USY catalysts.

In Example 5, comparative FCC cracking catalysts were fabricated from comparable USY zeolite catalysts ("USY catalysts") of the prior art and embodiments of the EMY zeolite catalysts ("EMY catalysts") of the present invention were fabricated with a matrix of a peptized aluminum oxide ($Al_2O_3$), a rare earth oxide, ($RE_2O_3$), and clay. All of these catalysts were made with a matrix comprised of 30 wt % peptized aluminum oxide ($Al_2O_3$), 1.7 wt % rare earth oxide, ($RE_2O_3$), 25 wt % either USY or EMY zeolite, with the balance clay.

The properties of the fresh catalysts and steam-deactivated catalysts from Example 5 are shown in the Table 3 for the USY catalysts and EMY catalysts made.

TABLE 3

Properties of USY & EMY Catalysts from Example 5

| Catalyst Formulation | 25% ULS-USY 30% Peptized $Al_2O_3$ 1.7% $RE_2O_3$ Balance: Clay | 25% ULS-EMY 30% Peptized $Al_2O_3$ 1.7% $RE_2O_3$ Balance: Clay |
|---|---|---|
| Fresh Catalyst Properties | | |
| Na (wt %) | 0.10 | 0.18 |
| BET Surface Area, $m^2/g$ | 286 | 251 |
| Matrix Surface Area, $m^2/g$ | 96 | 95 |
| Zeolite Surface Area, $m^2/g$ | 190 | 156 |
| Steam-deactivated Catalyst Properties | | |
| BET Surface Area, $m^2/g$ | 189 | 185 |
| Matrix Surface Area, $m^2/g$ | 74 | 72 |
| Zeolite Surface Area, $m^2/g$ | 116 | 113 |
| N2 BJH 40 Å Peak Height | 0.32 | 0.11 |

Figure 8:
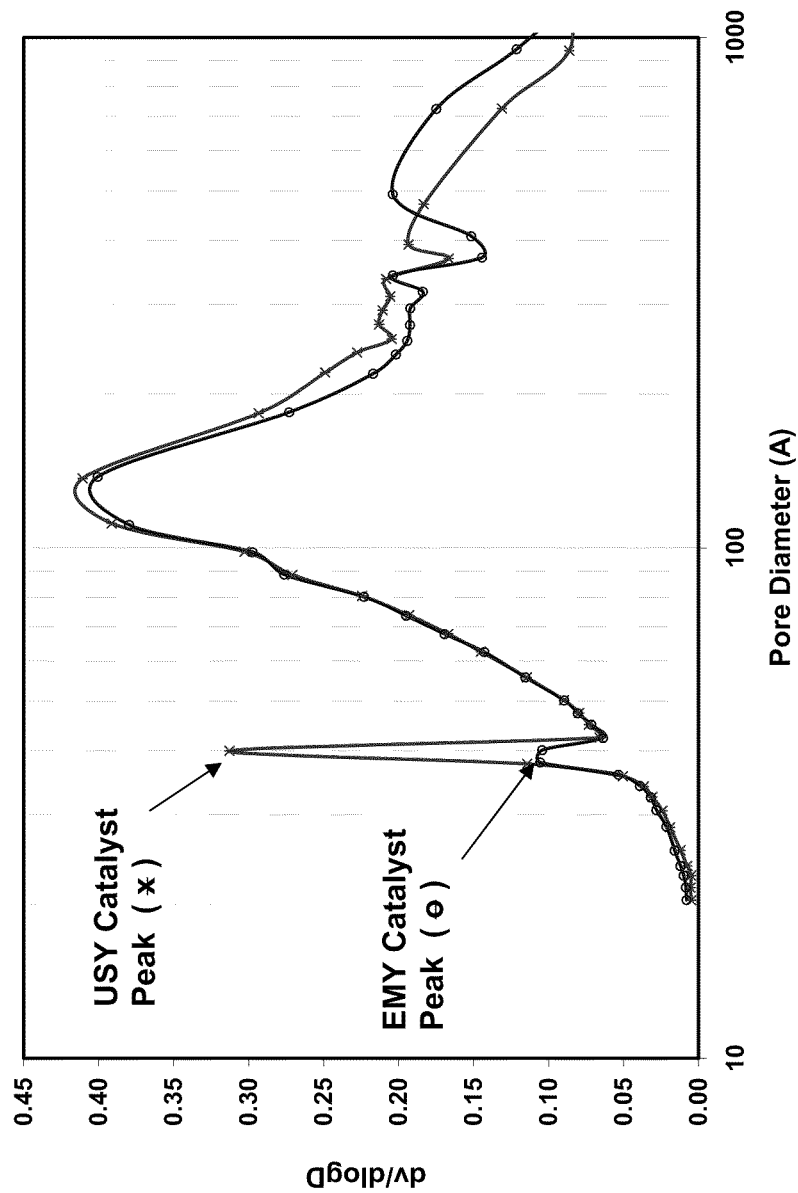
FIG. 8 is an overlay of BJH $N_2$ Desorption Plots for the USY and EMY $Al_2O_3$ matrix catalysts of Example 5.

Similar to the $SiO_2$ matrix catalysts of Example 3, it should be noted that the EMY catalysts of the present invention exhibit a significantly lower "N2 BJH: 40 Å Peak Heights" as compared to the comparable USY catalysts. An overlay of BJH Nitrogen Desorption Plots for each of the USY catalyst and the EMY catalyst of Example 5 is shown in FIG. 8. As can be seen in FIG. 8 the two desorption plots are very similar except for the obvious and significant difference in the area of the 40 Å peak. Again, it is this differentiating feature that is believed to be directly related to the improved hydrocarbon processing results achieved in the following example.

In a preferred embodiment, the EMY catalyst of the present invention has a 40 Å Peak of less than about 0.15 $cm^3/g$ as exhibited on the BJH $N_2$ Desorption Plot. In a more preferred embodiment, the EMY catalyst of the present invention has a 40 Å Peak of less than about 0.13 $cm^3/g$, even more preferably less than about 0.11 $cm^3/g$, and most preferably less than less than about 0.09 $cm^3/g$ as exhibited on the BJH $N_2$ Desorption Plot. The 40 Å Peak can be measured after fabrication of the fresh catalyst, but is preferably measured following steam deactivation of the catalyst.

As shown in Example 6, after steam deactivation at 1465° F. for 20 hours of the sample catalysts of Example 5, a sample of a USY zeolite catalyst ("USY catalyst") of the prior art was tested under typical FCC conditions in a pilot plant and the results compared to testing under the same conditions of a comparable EMY zeolite catalyst ("EMY catalyst") of the present invention. Similar to Example 4, the test results obtained in Example 6 were normalized to a constant coke yield of 3 wt % as a standard for comparison.

Figure 10A:
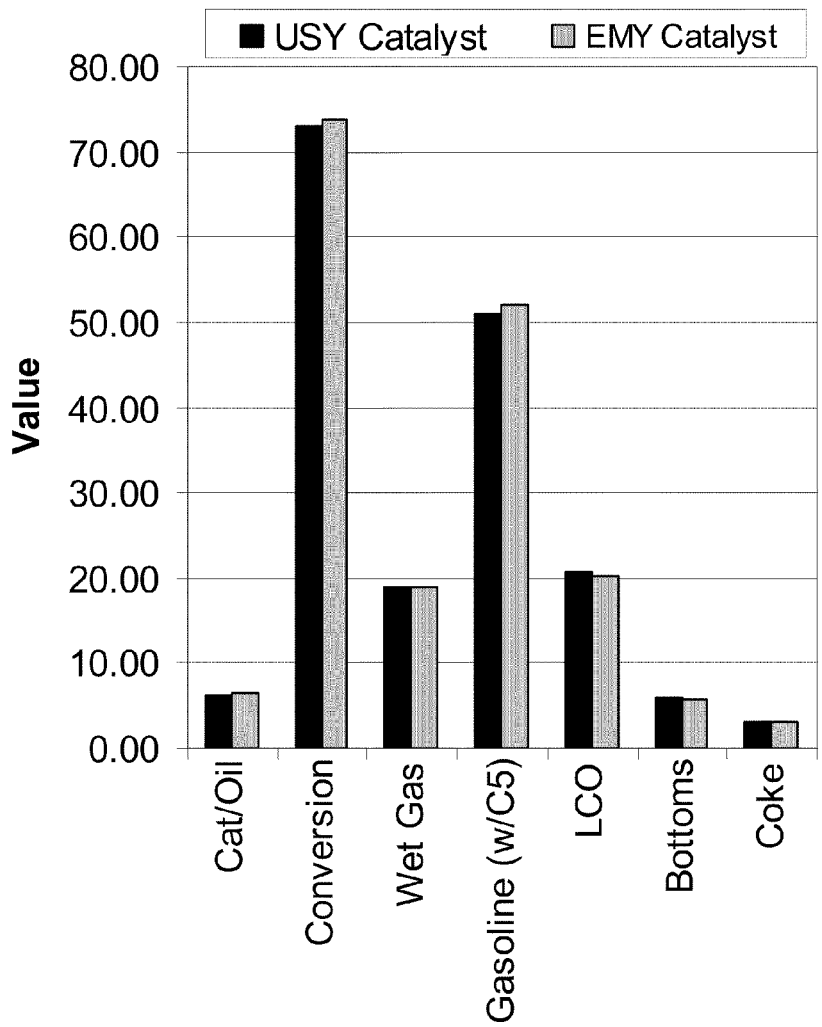
FIGS. 10A and 10B are graphs comparing the process test data from the USY and EMY $Al_2O_3$ matrix catalyst sample testing of Example 6.
Figure 10B:
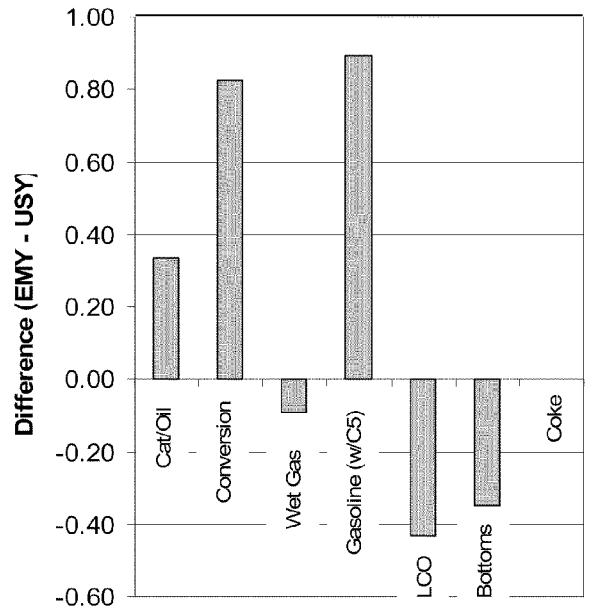

In Example 6, three (3) separate runs were made and the results from each run are presented in FIG. 9. The arithmetical average of the three (3) runs is presented in FIG. 10A and the difference in values between the EMY Catalyst relative to the USY Catalyst data of FIG. 10A is shown in FIG. 10B. As can be seen in FIGS. 10A and 10B, a higher catalyst-to-oil ratio for LS-EMY than LS-USY is utilized at constant coke yield. However, as explained prior, this is not an important factor as most units have the ability to adjust the catalyst-to-oil ratio in an FCC unit with little impact on overall unit economics. Additionally, in FIGS. 10A and 10B it can be seen that except for a decrease in light cycle oil ("LCO") yield, all of the other product variables have been improved. There is a substantial beneficial decrease in bottoms yields and a decrease in wet gas yields associated with the EMY catalyst. Additionally, there is a beneficial increase in both overall conversion as well as gasoline yields with an EMY catalyst of the present invention as compared to the USY catalyst.

In preferred embodiment of the present invention, the low mesopore peak fluidized catalytic cracking catalysts of the present invention are comprised of an EMY zeolite and an inorganic oxide matrix component. The inorganic oxide matrix component should be sufficient to bind the catalyst components together so that the catalyst product is hard enough to survive inter-particle and reactor wall collisions. The inorganic oxide matrix can be made from an inorganic oxide sol or gel which is dried to "glue" the catalyst components together. Preferably, the inorganic oxide matrix will be comprised of oxides of silicon, aluminum or combinations thereof. It is also preferred that separate alumina phases be incorporated into the inorganic oxide matrix. Species of aluminum oxyhydroxides-γ-alumina, boehmite, diaspore, and transitional aluminas such as α-alumina, β-alumina, γ-alumina, δ-alumina, ϵ-alumina, κ-alumina, and ρ-alumina can be employed. Preferably, the alumina species is an aluminum trihydroxide such as gibbsite, bayerite, nordstrandite, or doyelite. The matrix material may also contain phosphorous or aluminum phosphate.

In another preferred embodiment of the present invention, the low mesopore peak fluidized catalytic cracking catalyst is further comprised of a clay. Preferred clays for use in the present invention are relatively non-porous clays such as kaolin, bentonite, hectorite, sepiolite, and attapulgite. Preferably, the low mesopore peak cracking catalyst is comprised of a clay selected from kaolin, bentonite, and combinations thereof.

In another preferred embodiment of the present invention, the low mesopore peak fluidized catalytic cracking catalyst is further comprised of a medium-pore zeolite with is incorporated into the inorganic oxide matrix. Medium-pore size molecular sieves that are suitable for use herein include both medium pore zeolites and silicoaluminophosphates (SAPOs). Medium pore zeolites suitable for use in the practice of the present invention are described in "Atlas of Zeolite Structure Types", eds. W. H. Meier and D. H. Olson, Butterworth-Heineman, Third Edition, 1992, which is hereby incorporated by reference. The medium-pore size zeolites generally have an average pore diameter less than about 0.7 nm, typically from about 0.5 to about 0.7 nm and includes for example, MFI, MFS, MEL, MTW, EUO, MTT, HEU, FER, and TON structure type zeolites (IUPAC Commission of Zeolite Nomenclature). Non-limiting examples of such medium-pore size zeolites, include ZSM-5, ZSM-12, ZSM-22, ZSM-23, ZSM-34, ZSM-35, ZSM-38, ZSM-48, ZSM-50, silicalite, and silicalite 2. The most preferred medium pore zeolite used in the present invention is ZSM-5, which is described in U.S. Pat. Nos. 3,702,886 and 3,770,614. ZSM-11 is described in U.S. Pat. No. 3,709,979; ZSM-12 in U.S. Pat. No. 3,832,449; ZSM-21 and ZSM-38 in U.S. Pat. No. 3,948,758; ZSM-23 in U.S. Pat. No. 4,076,842; and ZSM-35 in U.S. Pat. No. 4,016,245. As mentioned above SAPOs, such as SAPO-11, SAPO-34, SAPO-41, and SAPO-42, which are described in U.S. Pat. No. 4,440,871 can also be used herein. Non-limiting examples of other medium pore molecular sieves that can be used herein are chromosilicates; gallium silicates; iron silicates; aluminum phosphates (ALPO), such as ALPO-11 described in U.S. Pat. No. 4,310,440; titanium aluminosilicates (TASO), such as TASO-45 described in EP-A No. 229,295; boron silicates, described in U.S. Pat. No. 4,254,297; titanium aluminophosphates (TAPO), such as TAPO-11 described in U.S. Pat. No. 4,500,651; and iron aluminosilicates. All of the above patents are incorporated herein by reference.

The present invention also includes a method of making the low mesoporous peak fluidized catalytic cracking catalysts described herein. A preferred method of making an embodiment of the low mesoporous peak catalysts herein comprises the steps of mixing a binder precursor selected from a silica, an alumina, or a combination thereof with a clay and a zeolite to form a catalyst mixture; and drying the catalyst mixture to form a catalyst; wherein the zeolite is a Y zeolite with a Large Mesopore Volume of at least about 0.03 cm$^3$/g and a Small Mesopore Peak of less than about 0.15 cm$^3$/g (i.e., an embodiment of an EMY zeolite). In preferred embodiment, the binder precursor is a colloidal silica, silica gel, a silica sol, or a combination thereof. In preferred embodiment, the binder precursor is a colloidal alumina, alumina gel, a alumina sol, or a combination thereof. In another more preferred embodiment, the binder precursor is a peptized alumina Methods for producing a peptized alumina as well as a peptized alumina bound catalyst are illustrated in U.S. Pat. Nos. 4,086,187 and 4,206,085 which are herein incorporated by reference.

Preferably, the clay is selected from kaolin, bentonite, and combinations thereof. Most preferred embodiments of the low mesoporous peak catalysts and method of making the low mesoporous peak catalysts of the present invention include combinations of some or all of the most preferred embodiments of the EMY zeolites and catalysts described herein.

In a preferred embodiment, of the catalysts and method of making the catalysts invention, include a rare earth element in the catalyst binder/mixture. The rare earth content of the catalyst is typically measured as an oxide. In other preferred embodiments of the method of making the low mesoporous peak catalysts, the catalyst mixture is milled prior to the catalysts drying step. In other preferred embodiments, the catalyst is formed by spray drying the catalyst mixture at a temperature from about 300° F. to about 650° F. Preferably, the final catalyst has an average particle size from about 20 microns to about 150 microns.

In a preferred embodiment of the present invention, is a fluidized catalytic cracking process for catalytically cracking a hydrocarbon feedstock using the catalysts of this invention. Preferably, the hydrocarbon feedstock is comprised substantially of hydrocarbons boiling in the range of from about 450 to about 1050° F. By "substantially" as used in the prior sentence, it is meant that at least 80 wt % of the hydrocarbon feedstock boils in the range of from about 450 to about 1050° F. Even more preferably, at least 90 wt % of the hydrocarbon feedstock boils in the range of from about 450 to about 1050° F.

As demand for crude supplies and feedstocks to petroleum refineries and petrochemical plants has increased, there has been a greater incentive to process heavier, higher molecular weight feedstreams in many of the associated separation and conversion units. In particular, as the overall feed compositions trend toward heavier molecular weight hydrocarbon feedstreams, it continues to become more desirable to catalytically crack these heavier feeds (also termed "bottoms cracking") to convert more of these components into high value liquid products. In a preferred embodiment of the present invention, the hydrocarbon feedstock is comprised of a gas oil stream, a vacuum bottoms stream, or a combination thereof.

In the FCC process, the hydrocarbon feedstock is conducted to a short contact-time FCC reactor. The hydrocarbon feedstock is injected through one or more feed nozzles into a reactor riser. Within this reactor riser, the hydrocarbon feedstock is contacted with a catalytic cracking catalyst of the present invention under cracking conditions thereby resulting in spent catalyst particles containing carbon deposited thereon and a lower boiling product stream. In more preferred embodiments of the process, the cracking conditions include: temperatures from about 1000° F. to about 1500° F. (538° C. to 816° C.), preferably about 1150° F. to about 1400° F. (621° C. to about 760° C.); hydrocarbon partial pressures from about 10 to 50 psia (70–345 kPa), preferably from about 20 to 40 psia (140-275 kPa); and a catalyst to feed (wt/wt) ratio from about 2 to 10, preferably 3 to 8, more preferably about 5 to 6, where the catalyst weight is total weight of the catalyst composite. Steam may be concurrently introduced with the feed into the reaction zone. The steam may comprise up to about 5 wt % of the feed. Preferably, the FCC feed residence time in the reaction zone is less than about 5 seconds, more preferably from about 3 to 5 seconds, and even more preferably from about 2 to 3 seconds.

In the fluidized catalytic cracking process herein, the hydrocarbon feedstock is catalytically cracked into lighter fuel products, in particular gasolines, naphthas, and distillates (or "light cycle oils").

The fluidized catalytic cracking catalyst herein may also be useful in other hydrocarbon catalytic conversion processes such as a hydrocracking process, a hydrodesulfurization process, a reforming process, an alkylation process, an oligomerization process, a dewaxing process, or an isomerization process.

Although the present invention has been described in terms of specific embodiments, it is not so limited. All suitable combinations and sub-combinations of preferred characteristics of the catalysts presented herein are contemplated by the present invention. Suitable alterations and modifications for operation under specific conditions will be apparent to those skilled in the art. It is therefore intended that the following claims be interpreted as covering all such alterations and modifications as fall within the true spirit and scope of the invention.

The Examples below are provided to illustrate the manner in which the EMY zeolites of the current invention were synthesized and illustrate the improved product qualities and the benefits from specific embodiments of the current invention thus obtained. These Examples only illustrate specific embodiments of the present invention and are not meant to limit the scope of the current invention.

EXAMPLES

Example 1

A commercial ammonium-exchanged Y zeolite with a low sodium content (CBV-300® from Zeolyst™, $SiO_2/Al_2O_3$ molar ratio=5.3, $Na_2O$ 3.15 wt % on dry basis) was steamed in a horizontal calcination oven which was at a temperature of 1000° F. and in a flow of 50% steam+50% $N_2$ for 1 hour. The resulting product was an ultra-stable Y (USY) zeolite, and was analyzed with a Micromeritics® Tristar 3000® analyzer to determine the pore size distribution characteristics by nitrogen adsorption/desorption at 77.35° K. The BJH method as described in the specification was applied to the $N_2$ adsorption/desorption isotherms to obtain the pore size distribution of the zeolite, and a plot of dV/dlogD vs. Average Pore Diameter is shown in FIG. 1.

A copy of the pertinent data generated by the BJH method generated from the $N_2$ adsorption/desorption isotherms for this zeolite sample is reproduced in Table 4 below. This test method and the associated format of data generated as presented are familiar to one of skill in the art.

TABLE 4

BJH Pore Volume Distribution of USY Sample

| Pore Diameter Range (nm) | Average Diameter (nm) | dV/dlogD Pore Volume (nm) | Cumulative Pore Volume (cm³/g) | Incremental Pore Volume (cm³/g) |
|---|---|---|---|---|
| 312.8-104.1 | 124.1 | 0.010 | 0.0048 | 0.0048 |
| 104.1-62.8 | 73.6 | 0.017 | 0.0085 | 0.0037 |
| 62.8-41.5 | 47.8 | 0.018 | 0.0117 | 0.0032 |
| 41.5-30.4 | 34.1 | 0.018 | 0.0142 | 0.0024 |
| 30.4-22.9 | 25.5 | 0.017 | 0.0162 | 0.0020 |
| 22.9-18.6 | 20.3 | 0.015 | 0.0175 | 0.0014 |
| 18.6-16.8 | 17.6 | 0.016 | 0.0182 | 0.0007 |
| 16.8-15.0 | 15.8 | 0.014 | 0.0189 | 0.0007 |
| 15.0-13.2 | 14 | 0.0152 | 0.0198 | 0.0008 |
| 13.2-11.7 | 12.4 | 0.0151 | 0.0206 | 0.0008 |
| 11.7-10.6 | 11.1 | 0.014 | 0.0212 | 0.0006 |
| 10.6-9.3 | 9.8 | 0.014 | 0.0220 | 0.0008 |
| 9.3-8.2 | 8.6 | 0.016 | 0.0229 | 0.0009 |
| 8.2-7.1 | 7.5 | 0.019 | 0.0241 | 0.0012 |
| 7.1-6.1 | 6.5 | 0.027 | 0.0259 | 0.0019 |
| 6.1-5.3 | 5.6 | 0.044 | 0.0286 | 0.0027 |
| 5.3-4.6 | 4.9 | 0.055 | 0.0317 | 0.0031 |
| 4.6-4.1 | 4.4 | 0.054 | 0.0344 | 0.0027 |
| 4.1-3.7 | 3.9 | 0.203 | 0.0443 | 0.0099 |
| 3.7-3.3 | 3.5 | 0.075 | 0.0476 | 0.0033 |
| 3.3-2.9 | 3.1 | 0.036 | 0.0497 | 0.0022 |
| 2.9-2.6 | 2.8 | 0.044 | 0.0517 | 0.0019 |
| 2.6-2.5 | 2.5 | 0.049 | 0.0531 | 0.0014 |
| 2.5-2.2 | 2.3 | 0.062 | 0.0558 | 0.0028 |

As can be seen in Table 4, a calculated Cumulative Pore Volume (cm³/g) is associated with a range of Pore Diameter (nm) as the test incrementally desorbs the nitrogen from the test sample. An Incremental Pore Volume is then calculated for each of these ranges. A pore volume within a certain range (for example a range from 50 to 500 Å, which is equivalent to 5 to 50 nm as presented in Table 4) can be calculated by subtracting the Cumulative Pore Volume at 50 nm from the Cumulative Pore Volume at 5 nm. Where necessary, the Cumulative Pore Volume at a specific pore size can be calculated by interpolating the data within the range. This method was utilized for all of the Examples herein.

For example, to determine the total pore volume associated with pore diameters between 5 nm and 50 nm, first the Cumulative Pore Volume associated with 50 nm was calculated by interpolating the amount of the Incremental Pore Volume (highlighted) associated with the difference between 62.8 nm and 50.0 nm in the 62.8 to 41.5 nm pore diameter range as shown in the table (highlighted) and adding this amount to the Cumulative Pore Volume (highlighted) from the prior range. The calculation for the Cumulative Pore Volume associated with 50 nm pore diameter was calculated from the data in Table 4 above as follows:

$$((62.8-50.0)/(62.8-41.5)*0.0032)+0.0085=0.0104 \text{ cm}^3/\text{g}$$

The calculation is then performed similarly for the Cumulative Pore Volume associated with 5 nm pore diameter. The calculation was as follows:

$$((5.3-5.0)/(5.3-4.6)*0.0031)+0.0286=0.0299 \text{ cm}^3/\text{g}$$

The total Pore Volume associated with the pore diameter ranges of 5 nm to 50 nm (50 Å to 500 Å) of the USY of this example is thus equal to the difference in the Cumulative Pore Volumes associated with 5 nm and 50 nm respectfully as follows:

$$0.0299 \text{ cm}^3/\text{g} - 0.0104 \text{ cm}^3/\text{g} = 0.0195 \text{ cm}^3/\text{g}$$

This value is the Large Mesopore Volume for this USY sample as shown in Table 1. All other pore volumes associated with specific pore diameter ranges can be and were calculated herein by the same basic method.

As such, the following properties of this USY zeolite were obtained from the data:

Small Mesoporous Volume (Range: 3.0 nm to 5.0 nm): 0.0193 cm³/g
Large Mesoporous Volume (Range: 5.0 nm to 50.0 nm): 0.0195 cm³/g
Ratio of (Large Mesopore Volume)/(Small Mesopore Volume): 1.01
Small Mesopore Peak (dV/dlogD@3.9 nm): 0.20 cm³/g Additionally, the USY zeolite sample exhibited a BET surface area of 811 m²/g, and a unit cell size of 24.55 angstroms.

A sample of the prepared USY zeolite above was further subjected to an ammonium ion-exchange consisting of adding 80 grams of the zeolite into 800 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours, Chemical analysis of the dried zeolite by ICP showed 0.48 wt % Na$_2$O (dry basis). A Na$_2$O content of about 0.50 wt % was targeted. The dried zeolite was subjected to long-term deactivation steaming at 1400° F. for 16 hours, 100% steam, to determine its hydrothermal stability.

The zeolite obtained after long-term deactivation steaming was similarly analyzed in a Micromeritics® Tristar 3000® analyzer. The BJH method was applied to the N$_2$ adsorption/desorption isotherms to obtain the pore size distribution of the zeolite, and a plot of dV/dlogD vs. Average Pore Diameter is shown in FIG. 2. The following properties of this long-term deactivation steamed USY zeolite were obtained from the data:

Small Mesoporous Volume (Range: 3.0 nm to 5.0 nm): 0.0112 cm³/g
Large Mesoporous Volume (Range: 5.0 nm to 50.0 nm): 0.1211 cm³/g
Ratio of (Large Mesopore Volume)/(Small Mesopore Volume): 10.85
Small Mesopore Peak (dV/dlogD@3.9 nm): 0.19 cm³/g Additionally, the USY zeolite after long-term deactivation steaming exhibited a BET surface area of 565 m²/g, and a unit cell size of 24.27 angstroms.

Example 2

In this example, an embodiment of the Extra Mesoporous Y ("EMY") zeolite was prepared as follows:

The same commercial ammonium-exchanged Y zeolite (CBV-300®) with a low sodium content (SiO$_2$/Al$_2$O$_3$ molar ratio=5.3, Na$_2$O 3.15 wt % on dry basis) as in Example 1 was placed in a horizontal quartz tube, which was inserted into a horizontal oven pre-equilibrated at 1400° F. in 100% steam at atmospheric pressure. Utilizing this procedure, the temperature of the zeolite precursor was raised to within 50° F. of the high temperature steam calcination temperature (i.e., to 1350° F.) within 5 minutes. The steam was let to pass through the zeolite powders. After 1 hour, the tube was removed from the horizontal oven and resulting EMY zeolite powders were collected. It should be noted that the starting material (i.e., the EMY precursor zeolite) selected was a low sodium content Y zeolite. As described in the specification above, it is believed that production of the EMY zeolite is dependent upon the proper zeolite sodium content prior to high temperature steam calcination. If the sodium content is not within the specifications as described herein, the starting Y zeolite may first require ammonium-exchange or methods as known in the art to reduce the sodium content of the EMY zeolite precursor to acceptable levels prior to high temperature steam calcination to produce the EMY zeolite.

The resulting EMY zeolite was analyzed by a Micromeritics Tristar 3000® analyzer as used in Example 1. The BJH method as described in the specification was applied to the N$_2$ adsorption/desorption isotherms to obtain the pore size distribution of the zeolite, and a plot of dV/dlogD vs. Average Pore Diameter is shown in FIG. 3. The following properties of this EMY zeolite were obtained:

Small Mesoporous Volume (Range: 3.0 nm to 5.0 nm): 0.0109 cm³/g
Large Mesoporous Volume (Range: 5.0 nm to 50.0 nm): 0.0740 cm³/g
Ratio of (Large Mesopore Volume)/(Small Mesopore Volume): 6.79
Small Mesopore Peak (dV/dlogD@3.9 nm): 0.09 cm³/g Additionally, the EMY zeolite sample exhibited a BET surface area of 619 m²/g, and a unit cell size of 24.42 angstroms.

A sample of the EMY zeolite above was further subjected to an ammonium ion exchange consisting of adding 100 grams of the EMY zeolite into 1000 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours. The ammonium ion exchange was repeated using 60 g of the washed EMY zeolite in 600 ml of NH$_4$NO$_3$ (1M) solution at 70° C. and agitating for 1 hour, followed by filtration on a funnel and washing the filter cake with 1000 ml of de-ionized water. The water rinsed zeolite cake was dried on the funnel by pulling air through, then in an oven at 120° C. in air for over 2 hours. Chemical analysis of the dried zeolite by ICP showed 0.64 wt % Na$_2$O (dry basis). A Na$_2$O content of about 0.50 wt % was targeted. This zeolite was then subjected to long-term deactivation steaming at 1400° F. for 16 hours, 100% steam, to determine its hydrothermal stability.

The EMY zeolite obtained after long-term deactivation steaming was also analyzed by a Micromeritics® Tristar 3000® analyzer. The BJH method was applied to the N$_2$ adsorption/desorption isotherms to obtain the pore size distribution of the zeolite, and a plot of dV/dlogD vs. Average Pore Diameter is shown in FIG. 4. The following properties of the EMY zeolite after long-term deactivation steaming were thus obtained from the data:

Small Mesoporous Volume (Range: 3.0 nm to 5.0 nm): 0.0077 cm³/g
Large Mesoporous Volume (Range: 5.0 nm to 50.0 nm): 0.1224 cm³/g
Ratio of (Large Mesopore Volume)/(Small Mesopore Volume): 15.97
Small Mesopore Peak (dV/dlogD@3.9 nm): 0.10 cm³/g Additionally, the surface area of the EMY zeolite after long-term deactivation steaming was analyzed by a BET Test. The zeolite exhibited a BET surface area of 587 m²/g, and a unit cell size of 24.27 angstroms.

Example 3

In this example, catalyst samples of FCC cracking catalysts were fabricated from comparable low sodium-USY zeolite catalysts ("LS-USY") as well ultralow sodium-USY zeolite catalysts ("ULS-USY") as of the prior art and embodiments of the low sodium-EMY zeolite catalysts ("LS-EMY") and ultralow sodium-EMY zeolite catalysts ("ULS-EMY") of the present invention as detailed in Example 3 herein. All of these catalysts were made with a matrix comprised of 21 wt % silicon oxide ($SiO_2$), 39 wt % clay, and 40 wt % either USY or EMY zeolite.

The catalysts of this example were fabricated as follows:

LS-EMY catalyst: 522.9 g of LS-EMY zeolite (91.8% solid) was mixed in 1618 g of deionized water, 546.7 g of Hydrite® (kaolin) clay (85.6% solid), and 741.2 g of Nalco-1034A® (colloidal silica) (34.0% solid), and mixed well, then milled to reduce the solid particle sizes. The mixture was spray dried in a catalyst spray dryer with a two-fluid nozzle and an outlet temperature of 300° F. The spray dried solid was calcined at 550° C. for 2 hours in air. The calcined solid was screened using 120-mesh and 325-mesh screens to obtain the fraction with particle sizes between about 44 and about 125 microns.

ULS-EMY catalyst: 511.3 g of ULS-EMY zeolite (94.0% solid) was mixed in 1629 g of deionized water, 546.7 g of Hydrite® (kaolin) clay (85.6% solid), and 741.2 g of Nalco-1034A® (colloidal silica) (34.0% solid), and mixed well, then milled to reduce the solid particle sizes. The mixture was spray dried in a catalyst spray dryer with a two-fluid nozzle and an outlet temperature of 300° F. The spray dried solid was calcined at 550° C. for 2 hours in air. The calcined solid was screened using 120-mesh and 325-mesh screens to obtain the fraction with particle sizes between about 44 and about 125 microns.

LS-USY catalyst: 547.3 g of LS-USY zeolite (87.7% solid) was mixed in 1593 g of deionized water, 546.7 g of Hydrite® (kaolin) clay (85.6% solid), and 741.2 g of Nalco-1034A® (colloidal silica) (34.0% solid), and mixed well, then milled to reduce the solid particle sizes. The mixture was spray dried in a catalyst spray dryer with a two-fluid nozzle and an outlet temperature of 300° F. The spray dried solid was calcined at 550° C. for 2 hours in air. The calcined solid was screened using 120-mesh and 325-mesh screens to obtain the fraction with particle sizes between about 44 and about 125 microns.

ULS-USY catalyst: 538.7 g of ULS-USY zeolite (89.1% solid) was mixed in 1602 g of deionized water, 546.7 g of Hydrite® (kaolin) clay (85.6% solid), and 741.2 g of Nalco-1034A® (colloidal silica) (34.0% solid), and mixed well, then milled to reduce the solid particle sizes. The mixture was spray dried in a catalyst spray dryer with a two-fluid nozzle and an outlet temperature of 300° F. The spray dried solid was calcined at 550° C. for 2 hours in air. The calcined solid was screened using 120-mesh and 325-mesh screens to obtain the fraction with particle sizes between about 44 and about 125 microns.

The finished catalysts were steam deactivated at approximately 1465° F. for 20 hours. The properties of the fresh catalysts and steam-deactivated catalysts fabricated in this Example are shown in the table in FIG. 5 for the LS-USY, LS-EMY, ULS-USY, and ULS-EMY catalysts made.

Example 4

In this example, the catalyst samples from Example 3 were tested in a laboratory scale ACE unit under conditions simulating fluidized catalytic cracking ("FCC") process conditions. An ACE (or "Advanced Cracking Evaluation") unit is a commercially available laboratory scale fluidized bed catalytic cracking unit commonly used in the industry for evaluating catalytic cracking catalysts, feedstocks, and process conditions. After steam deactivation of the sample catalysts at 1465° F. for 20 hours, two samples of the low sodium-USY zeolite catalysts ("LS-USY") of the prior art and one sample of the low sodium-EMY zeolite catalysts ("LS-EMY") catalysts as embodied by the present invention were tested by catalytically cracking a typical FCC hydrocarbon feedstock in the ACE unit at the following conditions:

TABLE 5A

Hydrocarbon Feedstock Properties (Example 4)

| Feedstock Property | Value |
| --- | --- |
| Carbon | 86.42 wt % |
| Hydrogen | 10.38 wt % |
| Sulfur | 1.47 wt % |
| Nitrogen | 1281 ppm |
| Basic Nitrogen | 358 ppm |
| Bromine Number | 17.94 |
| Refractive Index @ 70° C. | 1.49 |
| Specific Gravity of Liquids @ 70° C. | 0.897 |
| Molecular Weight (fp depression) | 333 g/mol |
| % 650-Boiling Point Material | 23 wt % |

TABLE 5B

ACE Testing Conditions (Example 4)

| Parameter | Value/Range |
| --- | --- |
| Cat/Oil Ratio | 3.5 to 8.5 |
| Reactor Temperature | 990° F. |
| Regenerator Temperature | 1300° F. |
| Feed Rate | 1.82 g/min |
| Catalyst Strip Time | 400 sec |
| Liquid Strip Time | 420 sec |

The cat-to-oil ratios and product yields were normalized to a constant coke yield of 3 wt % as a standard for comparison and these results are shown in FIGS. 6A, 6B, 7A, and 7B.

FIG. 6A compares the results of the LS-USY and LS-EMY catalysts tests (as normalized to 3 wt % coke yield). For ease of interpretation, the results from the two (2) LS-USY catalysts tests were combined and shown as single values. The product values are shown in wt % of the total hydrocarbon feed. The "conversion" value is calculated by: Total feed (i.e., 100 wt %) minus the wt % of 430° F.+liquid boiling point material in the product. Please note that the "wt % of 430° F.+liquid boiling point material in the product" does not include coke. The conversion value is shown in %.

For clarity purposes, FIG. 6B shows the arithmetic difference between the "LS-EMY" value from the data in FIG. 6A and the "LS-USY" value from the data in FIG. 6A.

FIG. 7A compares the results of the ULS-USY and ULS-EMY catalysts tests (as normalized to 3 wt % coke yield). For ease of interpretation, the results from the two (2) ULS-USY catalysts tests were combined and shown as single values. The values are shown in similar units as described in FIG. 6A, above.

FIG. 7B, similar to FIG. 6B, shows the arithmetic difference between the "ULS-EMY" value from the data in FIG. 7A and the "ULS-USY" value from the data in FIG. 7A.

Example 5

In this example, catalyst samples of FCC cracking catalysts were fabricated from comparable USY zeolite catalysts ("USY catalysts") of the prior art and embodiments of the EMY zeolite catalysts ("EMY catalysts") of the present invention were fabricated with a matrix of a peptized aluminum oxide ($Al_2O_3$), a rare earth oxide, ($RE_2O_3$), and clay. All of these catalysts were made with a matrix comprised of 30 wt % peptized aluminum oxide (Al$_2$O$_3$), 1.7 wt % rare earth oxide, (RE$_2$O$_3$), 25 wt % either USY or EMY zeolite, with the balance clay.

All of the catalysts of this example were made by preparing peptized alumina by mixing a 20 wt % slurry of pseudoboehmite with 0.3 mols of HCl per mol of Al$_2$O$_3$. 25% zeolite, 30% peptized alumina, 5% colloidal silica and 1.7% RE$_2$O$_3$ from RECl$_3$ and clay were mixed for about 10 minutes. The mixture was milled in a ball mill to reduce particle size and then dried in a catalyst spray dryer operated at 650° F. inlet and 300° F. outlet temperatures. The spray dried catalyst was calcined at 750° F., washed to lower Na$_2$O, filtered and rinsed with deionized water and oven dried.

The finished catalysts were steam deactivated at approximately 1465° F. for 20 hours. The properties of the fresh catalysts and steam-deactivated catalysts fabricated in this Example are shown in the Table 3.

Example 6

In this example, the catalyst samples from Example 5 were tested in a laboratory scale ACE unit under conditions simulating fluidized catalytic cracking ("FCC") process conditions. The catalysts of Example were tested by catalytically cracking a typical FCC hydrocarbon feedstock (same feedstock composition as in Example 4, Table 5A) in the ACE unit at the following conditions:

TABLE 6

ACE Testing Conditions (Example 6)

| Parameter | Value/Range |
|---|---|
| Cat/Oil Ratio | 4 to 8 |
| Reactor Temperature | 980° F. |
| Feed Rate | 3 g/min |
| Catalyst Strip Time | 400 sec |
| Liquid Strip Time | 400 sec |

The cat-to-oil ratios and product yields were normalized to a constant coke yield of 3 wt % as a standard for comparison and these results are shown in FIGS. 10A and 10B.

FIG. 10A compares the results of the USY and EMY aluminum oxides catalysts tests (as normalized to 3 wt % coke yield). For ease of interpretation, the results from the two (2) LS-USY catalysts tests were combined and shown as single values. The product values are shown in wt % of the total hydrocarbon feed. The "conversion" value is calculated by the: Total feed (i.e., 100 wt %) minus the wt % of 430° F.+ liquid boiling point material in the product. Please note that the "wt % of 430° F.+ liquid boiling point material in the product" does not include coke. The conversion value is shown in %.

For clarity purposes, FIG. 10B shows the arithmetic difference between the EMY catalyst values from the data in FIG. 10A and the USY catalyst values from the data in FIG. 6A.

What is claimed is:

1. A fluidized catalytic cracking process for catalytically cracking a hydrocarbon feedstock, comprising:
    a) contacting the hydrocarbon feedstock with a fluidized catalytic cracking catalyst comprised of a Y zeolite with a Large Mesopore Volume of at least about 0.03 cm$^3$/g and a Small Mesopore Peak of less than about 0.15 cm$^3$/g; and an inorganic matrix; and
    b) producing at least one product stream which has a lower average molecular weight than the hydrocarbon feedstock;
    wherein the zeolite has a Large Mesopore Volume of at least about 0.03 cm$^3$/g, and a Small Mesopore Peak of less than about 0.15 cm$^3$/g.

2. The process of claim 1, wherein the hydrocarbon feedstock is contacted with the fluidized catalytic cracking catalyst at cracking conditions comprising temperatures from about 1000° F. to about 1500° F. (538° C. to 816° C.).

3. The process of claim 2, wherein hydrocarbon feedstock is contacted with the fluidized catalytic cracking catalyst in a riser reaction zone for less than about 5 seconds and the catalyst to feed (wt/wt) ratio is from about 2 to 10.

4. The process of claim 3, wherein the at least one product stream is selected from gasolines, naphthas, and distillates.

5. The process of claim 1, wherein the zeolite has a Large-to-Small Pore Volume Ratio of at least about 4.0.

6. The process of claim 1, wherein the unit cell size of the zeolite is less than about 24.45 Å.

7. The process of claim 1, wherein the inorganic matrix is comprised of oxides of silicon, aluminum or combinations thereof.

8. The process of claim 1, wherein the inorganic matrix is comprised of a peptized alumina.

9. The process of claim 1, wherein the catalyst is further comprised of a clay selected from kaolin, bentonite, hectorite, sepiolite, and attapulgite.

10. The process of claim 1, wherein the catalyst has a 40 Å Peak of less than about 0.15 cm$^3$/g.

11. The process of claim 1, wherein the inorganic matrix is comprised of an alumina phase selected from species of aluminum oxyhydroxides-γ-alumina, boehmite, pseudo-boehmite, diaspore, alpha-alumina, beta-alumina, gamma-alumina, delta-alumina, epsilon-alumina, kappa-alumina, and rho-alumina.

12. The process of claim 11, wherein the alumina phase is gibbsite, bayerite, nordstrandite, or doyelite.

13. The process of claim 1, wherein inorganic matrix also contains phosphorous or aluminum phosphate.

14. The process of claim 1, wherein the catalyst is further comprised of a medium-pore zeolite with an average pore diameter less than about 0.7 nm.

15. The process of claim 1, wherein the zeolite is obtained by subjecting a precursor Na—Y zeolite to a high temperature steam calcination step at a temperature from about 1200° F. to about 1500° F. wherein the temperature of the zeolite precursor is within 50° F. of the high temperature steam calcination temperature in less than 5 minutes.

16. The process of claim 15, wherein the Y zeolite is obtained by ammonium exchange of a Na—Y zeolite to form a precursor prior to the high temperature steam calcination step having a Na$_2$O content from about 2 to about 5 wt % of the total precursor weight on a dry basis.

17. The process of claim 10, wherein the Small Mesopore Peak of the zeolite is less than about 0.13 cm$^3$/g.

18. The process of claim 17, wherein the catalyst has a 40 Å Peak of less than about 0.13 cm$^3$/g and the Large Mesopore Volume of the zeolite is at least about 0.05 cm$^3$/g.

19. The process of claim 1, wherein the inorganic matrix is further comprised of a rare-earth element.

20. The process of claim 1, wherein the zeolite is comprised of a rare-earth element.

* * * * *